US008898670B2

(12) United States Patent
Matsuda et al.

(10) Patent No.: US 8,898,670 B2
(45) Date of Patent: Nov. 25, 2014

(54) INFORMATION PROCESSING APPARATUS, POWER CONTROL METHOD, AND COMPUTER PRODUCT

(75) Inventors: Akio Matsuda, Kawasaki (JP); Ryosuke Oishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 365 days.

(21) Appl. No.: 13/332,887

(22) Filed: Dec. 21, 2011

(65) Prior Publication Data

US 2012/0240120 A1 Sep. 20, 2012

(30) Foreign Application Priority Data

Mar. 18, 2011 (JP) ................... 2011-061188

(51) Int. Cl.
*G06F 9/46* (2006.01)
*G06F 1/32* (2006.01)
*G06F 9/48* (2006.01)

(52) U.S. Cl.
CPC ............ *G06F 9/4893* (2013.01); *G06F 1/3206* (2013.01); *Y02B 60/144* (2013.01)
USPC ........................................ 718/102

(58) Field of Classification Search
None
See application file for complete search history.

(56) References Cited

U.S. PATENT DOCUMENTS

| 6,807,159 | B1 | 10/2004 | Shorey et al. | |
| 7,586,864 | B2 | 9/2009 | Aoki | |
| 2005/0085279 | A1* | 4/2005 | Aoki | 455/574 |

FOREIGN PATENT DOCUMENTS

| JP | 2002-185475 A | 6/2002 |
| JP | 2005-130436 A | 5/2005 |

* cited by examiner

*Primary Examiner* — Mengyao Zhe
(74) *Attorney, Agent, or Firm* — Fujitsu Patent Center

(57) ABSTRACT

An information processing apparatus includes a first detector that detects a scheduled starting time of an event to be corrected and executed at the current time or thereafter; a second detector that detects in processing contents differing from that of the event detected by the first detector, a scheduled starting time of each event to be executed at the current time or thereafter; a calculator that calculates the difference between the scheduled starting time detected by the first detector and each scheduled starting time detected by the second detector; a determiner that determines a target event for the event to be corrected, based on the calculated differences; and a corrector that corrects the scheduled starting time of the event to be corrected such that an interval becomes short between the scheduled starting time of the event to be corrected and the scheduled starting time of the target event.

14 Claims, 23 Drawing Sheets

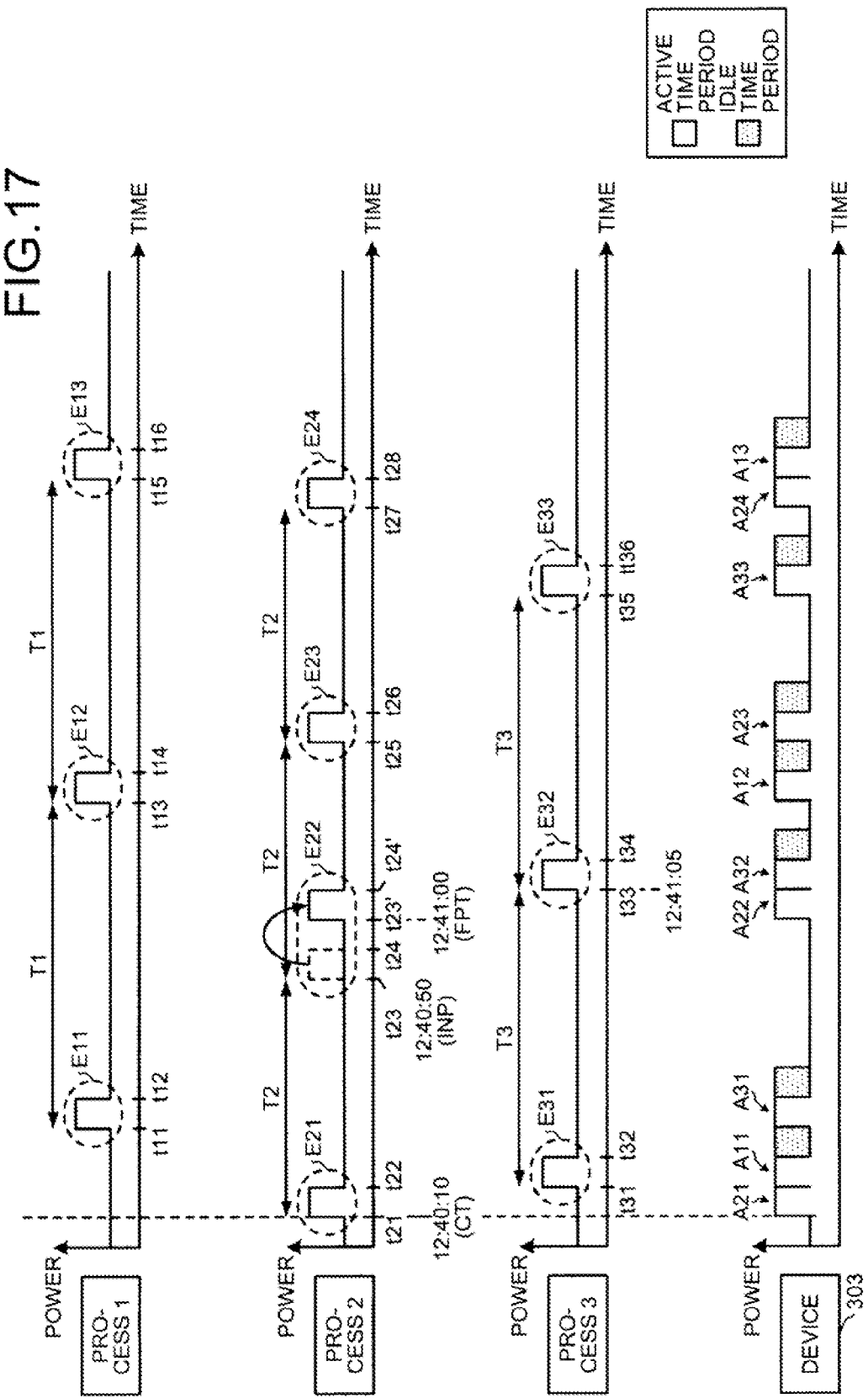

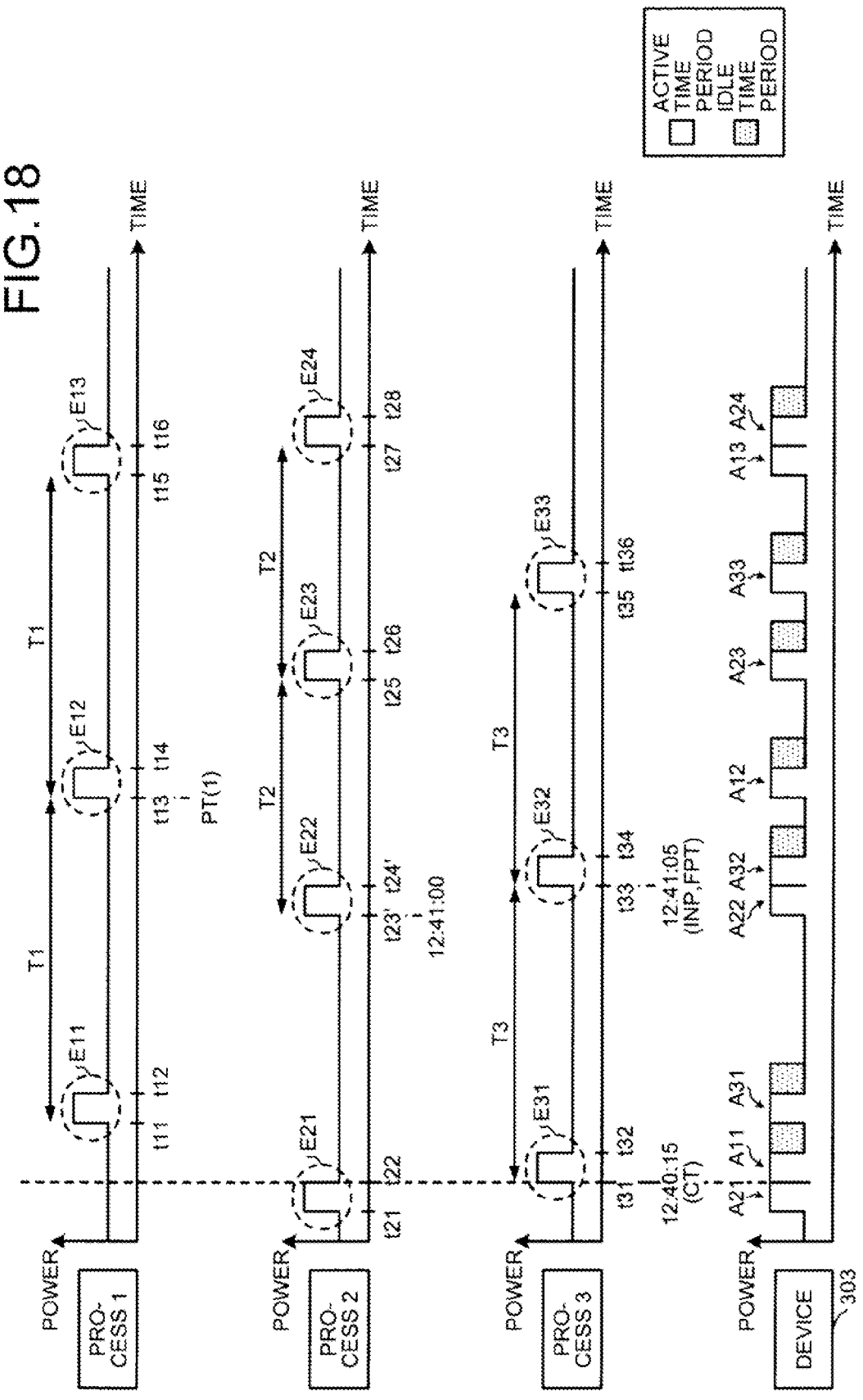

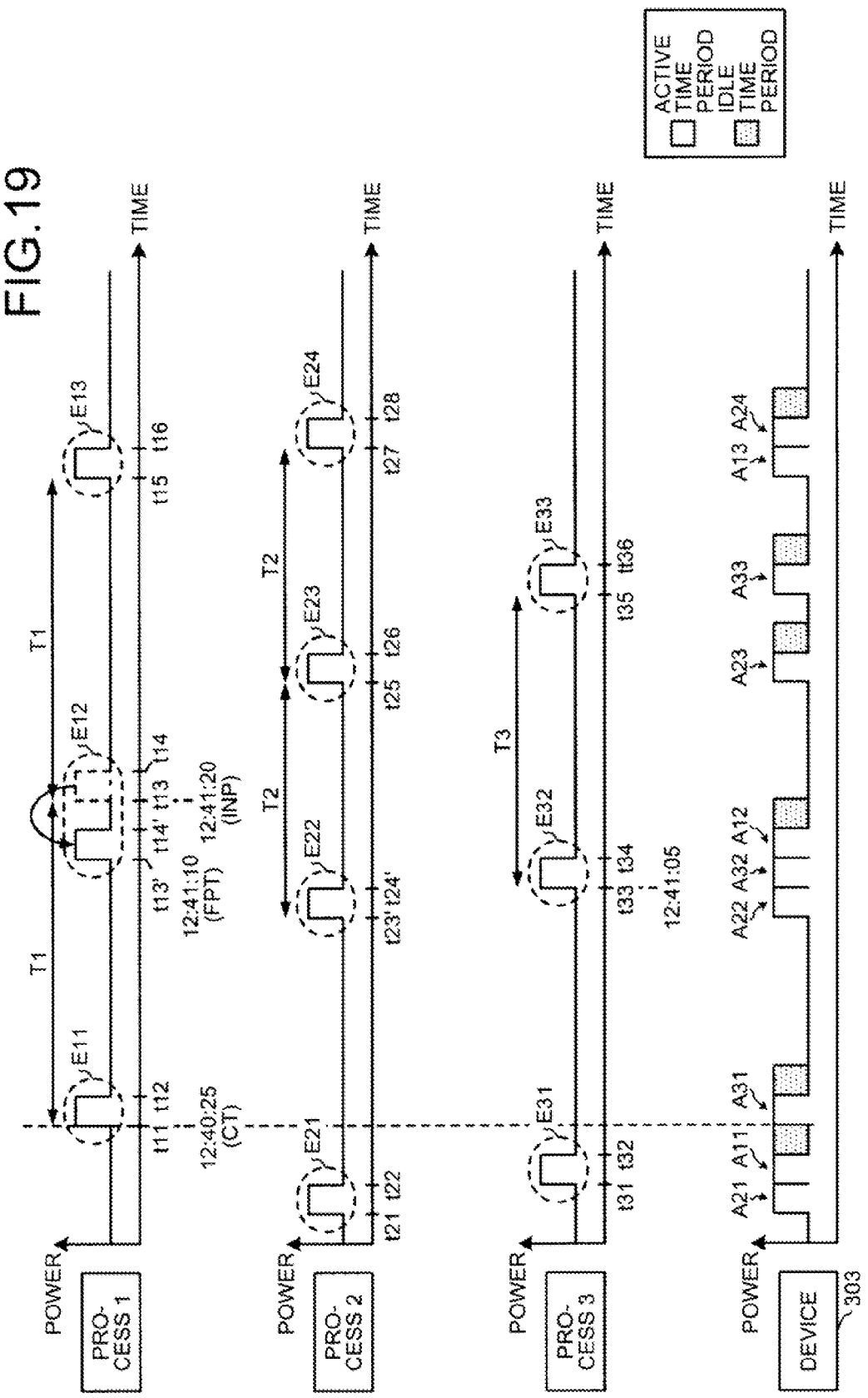

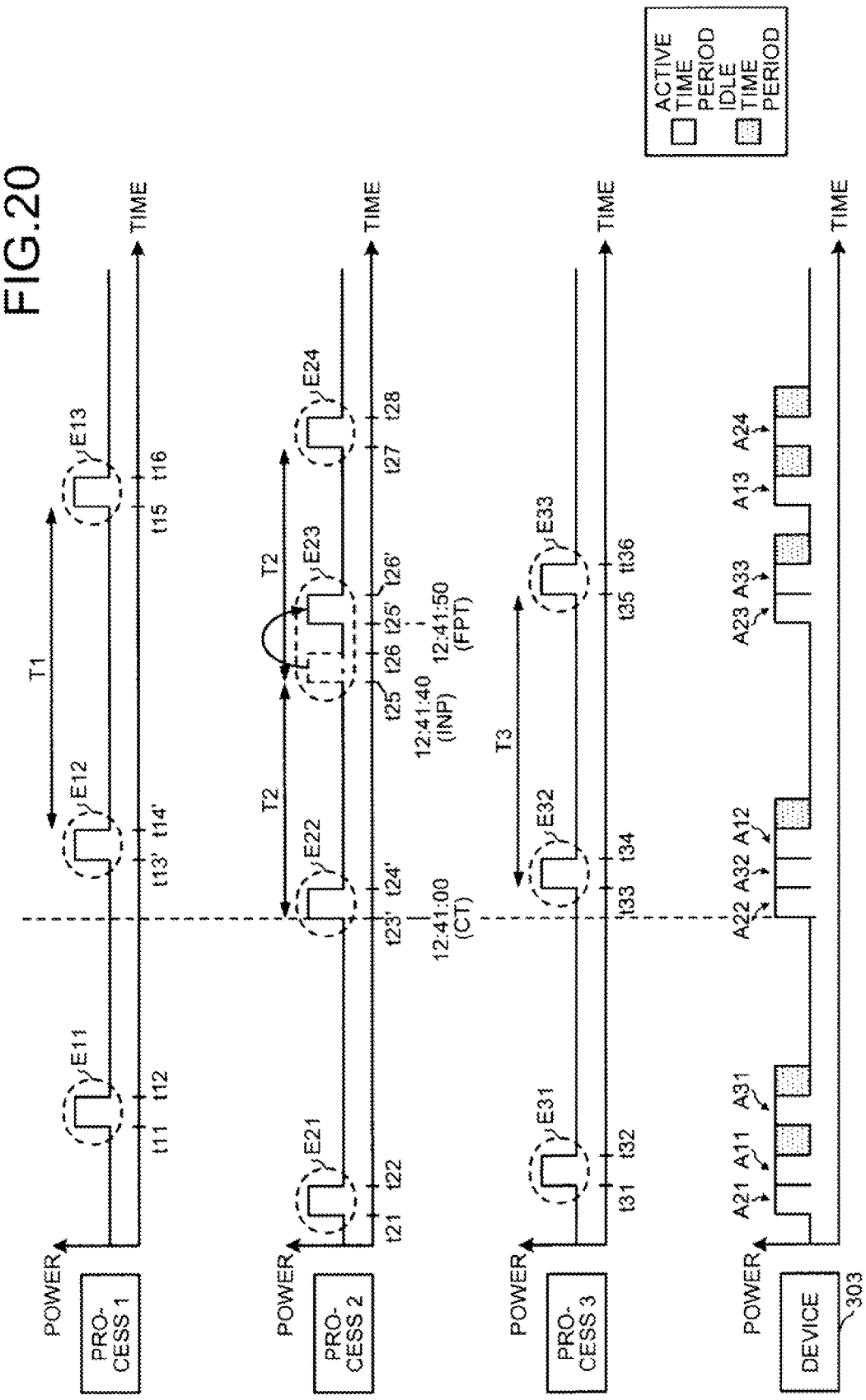

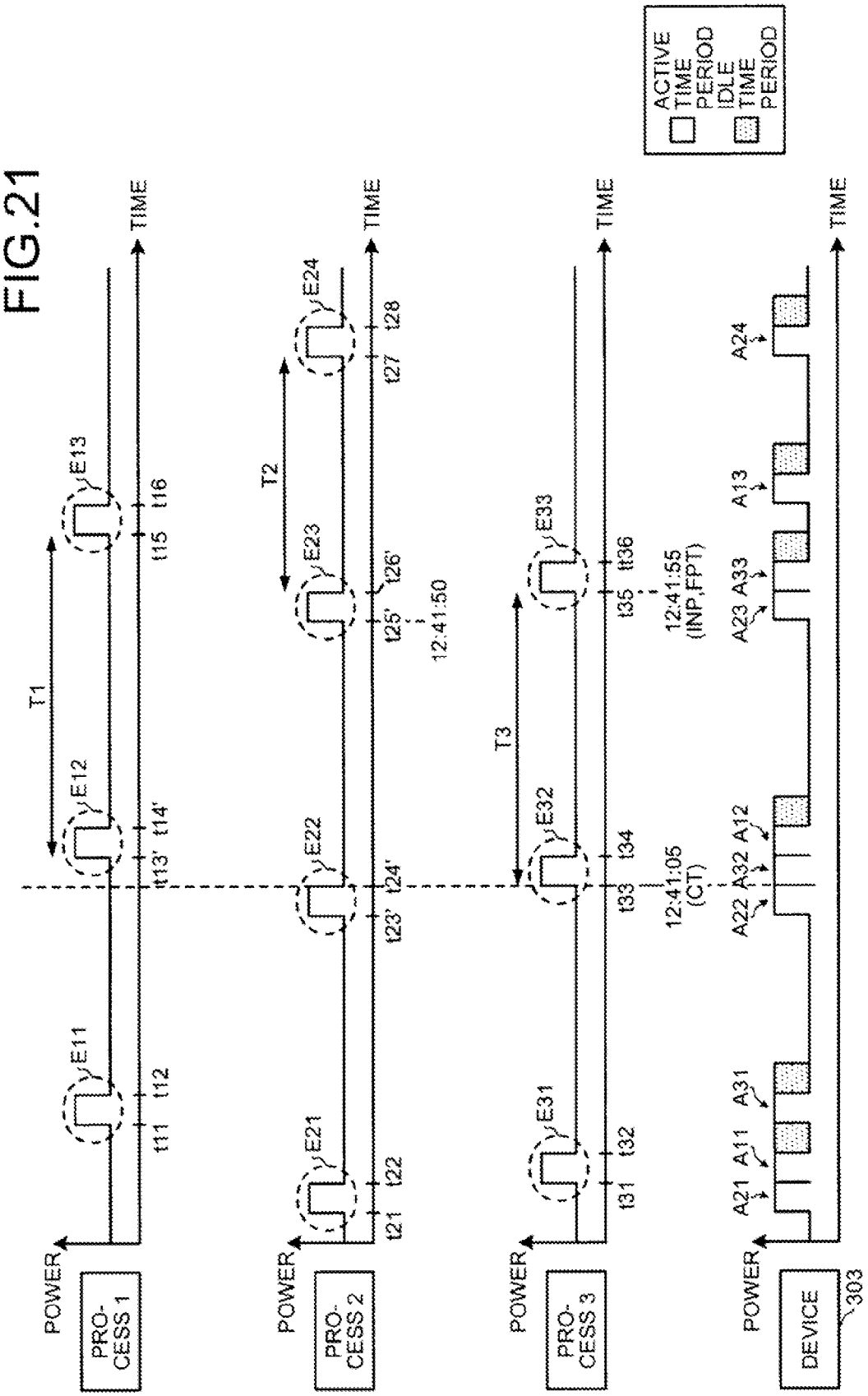

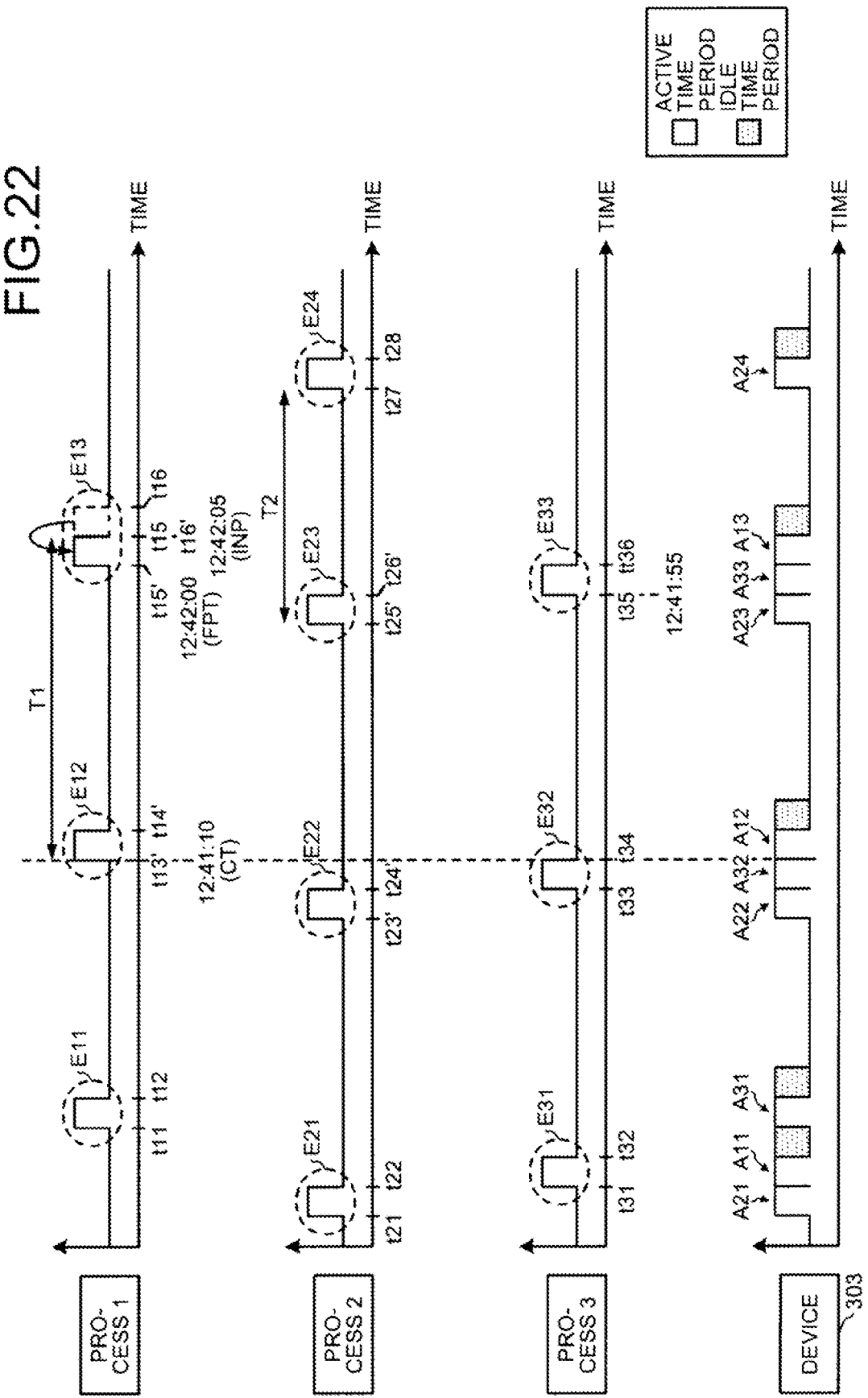

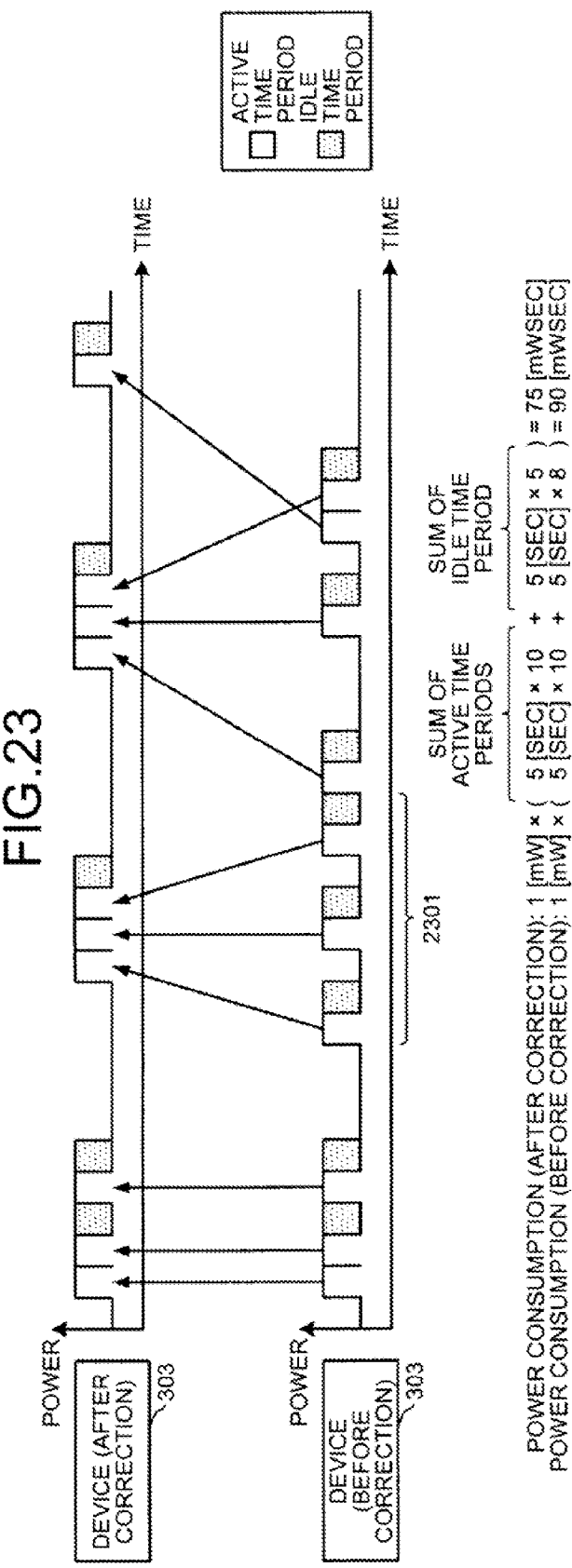

INFORMATION PROCESSING APPARATUS, POWER CONTROL METHOD, AND COMPUTER PRODUCT

CROSS REFERENCE TO RELATED APPLICATIONS

This application is based upon and claims the benefit of priority of the prior Japanese Patent Application No. 2011-061188, filed on Mar. 18, 2011, the entire contents of which are incorporated herein by reference.

FIELD

The embodiments discussed herein are related to an information processing apparatus and power control.

BACKGROUND

Portable terminal devices, such as portable telephones and personal digital assistants (PDA), having a multi-task operating system (OS) have recently increased. Among such portable terminal devices are devices to which can be added, software whose functions, user interface expression capability, and operability are improved (also referred to as a "rich client"). These portable terminal devices have various functions in addition to making calls. The portable terminal devices offer various functions to the user by executing applications related to email, Web browser, news, viewing of blogs and the like, maps, traffic information, and games, for example.

In portable terminal devices providing various functions such as those above, power consumption increases accompanying increases in the number of functions the device provides. For example, a smart phone is an example of the portable terminal device that has a multi-task OS, and smart phones consume a large amount of power. The functions provided by smart phones include a function that consequent to processes regularly executed such as the reception of email and the updating of resource description framework site summary (RSS) causes the hardware and the software of the portable terminal device to be executed even when the user is not operating the portable terminal device. Such functions further increase the power consumption of the portable terminal device.

A technique has been disclosed that involves estimating the time point of arrival of a packet and based on the estimated time point of arrival, switching the state from an active state of unlimited use of power to a low power state, or from the low power state to the active state, to reduce power consumption (see, e.g., Japanese Laid-Open Patent Publication No. 2002-185475).

Another technique has been disclosed that involves setting the transmission cycle of a beacon signal transmitted by a base station, based on a setting request requested by a terminal station in a wireless communication system, to reduce power consumption. According to this technique, the terminal station causes the check interval of the email application executed by the terminal station and the transmission cycle of the beacon of the base station to coincide. Consequently, the termination station is able to turn off the power supply to the communication circuit until the time when the beacon signal is to be received, enabling reduced power consumption (see, e.g., Japanese Laid-Open Patent Publication No. 2005-130436).

However, according to the conventional techniques, the amount of data transmitted and received by the portable terminal device is estimated based on the result of observation. Therefore, when a large amount of data occurs, a problem arises in that the power consumption of the device increases. According to the technique disclosed in Japanese Laid-Open Patent Publication No. 2002-185475, applications providing various functions do not always operate as expected by the portable terminal device, or one application may operate independently from other applications, resulting in increased power consumption.

According to the other conventional technique, assuming that a transmission process by the base station is "application 1" and a checking process of an email application by the terminal station is "application 2", this conventional technique is applicable to a portable terminal device and the application 1 can be operated in conjunction with the operation of the application 2. However, a problem arises in that, even if the applications 1 and 2 are associated with each other, power consumption may be affected by the operation of other applications and may not be reduced sufficiently as a result.

SUMMARY

According to an aspect of an embodiment, an information processing apparatus includes a first detector that detects a scheduled starting time of an event that is to be corrected and to be executed at the current time or thereafter; a second detector that detects in processing contents that are different from that of the event detected by the first detector, a scheduled starting time of each event among a plurality of events to be executed at the current time or thereafter; a calculator that calculates the difference between the scheduled starting time detected by the first detector and each of the scheduled starting times detected by the second detector; a determiner that determines a target event for the event to be corrected, from among the plurality of events based on a group of differences calculated by the calculator; and a corrector that corrects the scheduled starting time of the event to be corrected such that an interval becomes short between the scheduled starting time of the event to be corrected and the scheduled starting time of the target event determined by the determiner.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 17 depicts an example of correcting the scheduled starting time of an event according to a second example.

FIG. 18 depicts an example of correcting the scheduled starting time of an event according to the second example.

FIG. 19 depicts an example of correcting the scheduled starting time of an event according to the second example.

FIG. 20 depicts an example of correcting the scheduled starting time of an event according to the second example.

FIG. 21 depicts an example of correcting the scheduled starting time of an event according to the second example.

FIG. 22 depicts an example of correcting the scheduled starting time of an event according to the second example.

FIG. 23 is an explanatory diagram of the execution time period before and after the correction of the device 303 according to the second example.

DESCRIPTION OF EMBODIMENTS

Preferred embodiments of the present invention will be explained with reference to the accompanying drawings.

In the embodiment, a portable terminal device will be described as an example of the information processing apparatus. The portable terminal device may be, for example, a mobile telephone, a smart phone, or a PDA (Personal Digital Assistant). In addition to a call function, the portable terminal device provides to a user various functions, by executing applications related to email, Web browser, news, viewing of blogs and the like, maps, traffic information, and games, for example.

In the portable terminal device, one application is executed as one process or multiple processes. Each of the processes generates events. An "event" is a signal transmitted to another device associated with the execution of a process.

The portable terminal device according to the embodiment corrects a time point at which execution of an event generated by a process is started (hereinafter, "scheduled starting time") such that the scheduled starting time is brought close to the scheduled starting time of an event generated by another process. An event whose scheduled starting time is to be corrected is hereinafter referred to as an "event to be corrected". An event whose scheduled starting time is the target to which the scheduled starting time that is to be corrected is brought closer, is referred to as a "target event".

Thus, the execution time periods when a device executes associated processes of the event to be corrected and the execution time periods of other events are bundled, thereby reducing the overall execution time period of the device and enabling reduced power consumption of the device. The event to be corrected and the other events may be events generated by different processes of a single application, or events generated by processes that are of different applications. Events generated in the portable terminal device may include events that are not handled as events to be corrected.

Figure 1:
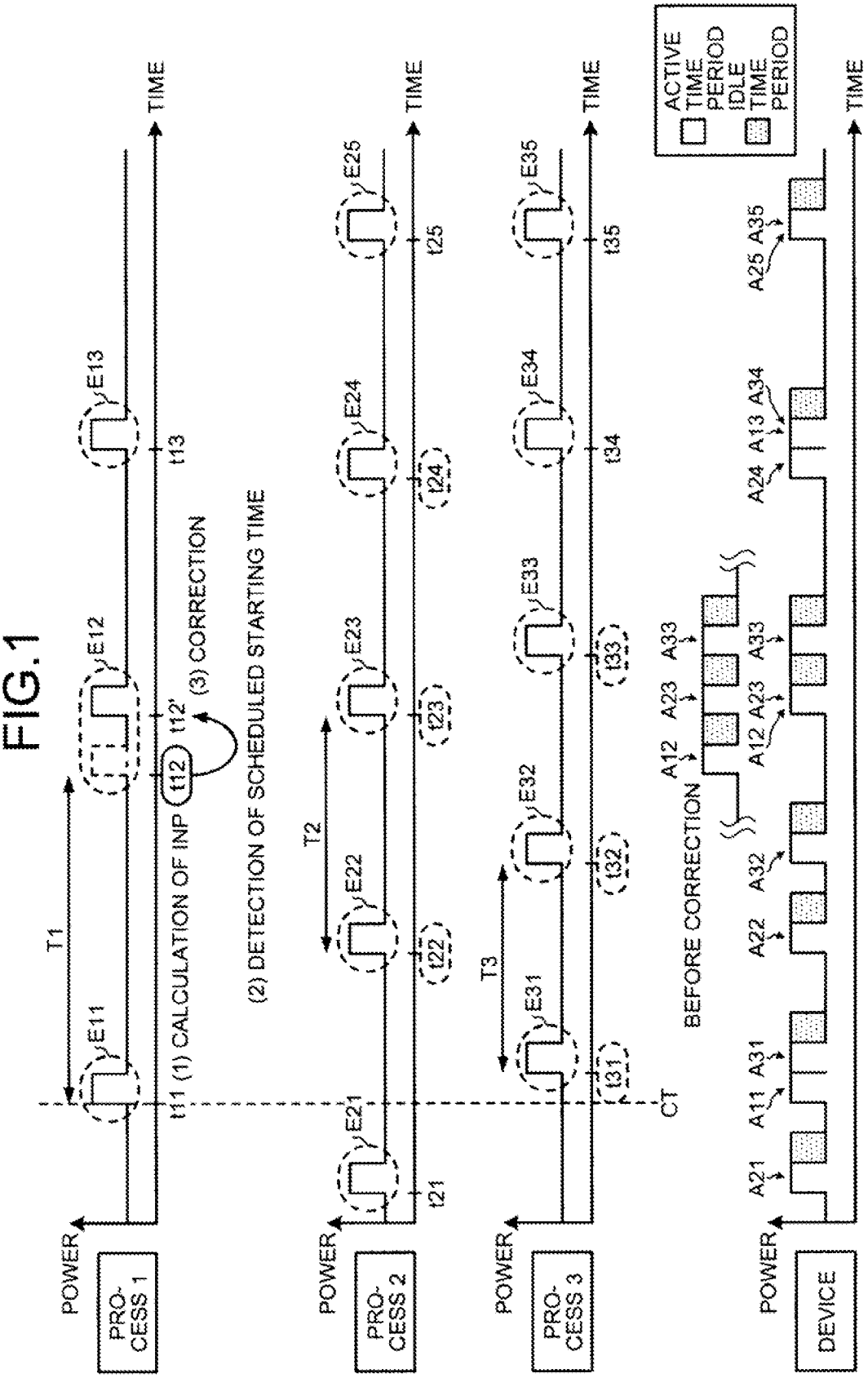
FIG. 1 is an explanatory diagram of the content of the correction of a scheduled starting time of an event to be corrected by a portable terminal device.

FIG. 1 is an explanatory diagram of the content of the correction of a scheduled starting time of an event to be corrected by the portable terminal device. In FIG. 1, in the portable terminal device, three types of applications are executed as processes 1, 2, and 3. Each of the processes operates at specific time intervals (hereinafter, "polling intervals") and executes an event that corresponds to the process.

Although in this example, three types of applications are assumed to be executed as the processes 1, 2, and 3, a single application may be executed as the processes 1, 2, and 3; or where a single application is executed as the processes 1 and 2 and another single application is executed as the process 3.

Events generated by the process 1 at polling intervals T1 are denoted by E11 to E13. Scheduled starting times of the events executed by the process 1 are denoted by t11 to t13.

Events generated by the process 2 at polling intervals T2 are denoted by E21 to E25. Scheduled starting times of the events executed by the process 2 are denoted by t21 to t25.

Events generated by the process 3 at polling intervals T3 are denoted by E31 to E35. Scheduled starting times of the events executed by the process 3 are denoted by t31 to t35.

Assuming that the time point t11 at which the process 1 starts execution of the event E11 is the current time current time (CT), the content of the correction will be described taking an example of a case where the portable terminal device corrects the scheduled starting time of the event E12 that is subsequently executed by the process 1.

(1) The portable terminal device adds the polling interval T1 to the current time t11 and thereby, calculates a scheduled starting time INP (ideal next polling time) before the correction of the event E12. In this case, the scheduled starting time INP before the correction is the time t12 acquired by adding T1 to the time tn.

(2) The portable terminal device detects the scheduled starting times of events executed by the processes 2 and 3 within a predetermined time period at the current time CT and thereafter. In this case, it is assumed that the predetermined time period spans from the current time CT to the time t13. Therefore, the portable terminal device detects the scheduled starting times t22 to t24 of the events E22 to E24 executed by the process 2 and also detects the scheduled starting times t31 to t33 of the events E31 to E33 executed by the process 3.

(3) The portable terminal device determines as the target event, an event whose scheduled starting time is closest to the scheduled starting time t12 before the correction of the event E12, among the events executed by the processes 2 and 3. The portable terminal device corrects the scheduled starting time of the event E12 to be the scheduled starting time of the target event determined. The portable terminal device corrects the scheduled starting time of the event E12, from the time t12 to the scheduled starting time t23 of the event E23, which is the target event.

As a result, the portable terminal device bundles the execution time periods when the device executes the associated processes of the events E12 and E23 and reduce the power consumption of the device. The "execution time period" is a time period acquired by summing the time period during which the device is used to process an event (hereinafter, "active time period") and a time period during which the device transitions to a low power mode after processing the event (hereinafter, "idle time period").

For example, the execution time periods of the device are bundled as indicated by the timeline depicting operation of the device. Active time periods when the device is performing processes for the events E11 to E13 are denoted by "A11 to A13". Active time periods when the device is performing processes for the events E21 to E25 are denoted by "A21 to A25". Active time periods when the device is performing processes for the events E31 to E35 are denoted by "A31 to A35".

For example, the execution time period before the correction is the sum of the active time periods (A12, A23, and A33) and the idle time periods of the device for the event E12 of the process 1, the event E23 of the process 2, and the event E33 of the process 3. On the other hand, because the event E12 of the process 1 and the event E23 of the process 2 are simultaneously executed, the execution time period of the device is lower after the correction as compared to the execution time period before the correction by an execution time period that corresponds to the active time period and the idle time period of the device for the event E12. In this manner, the portable terminal device is able to reduce the execution time period of the device and thereby, reduce power consumption, which is proportional to the execution time period of the device.

Figure 2:
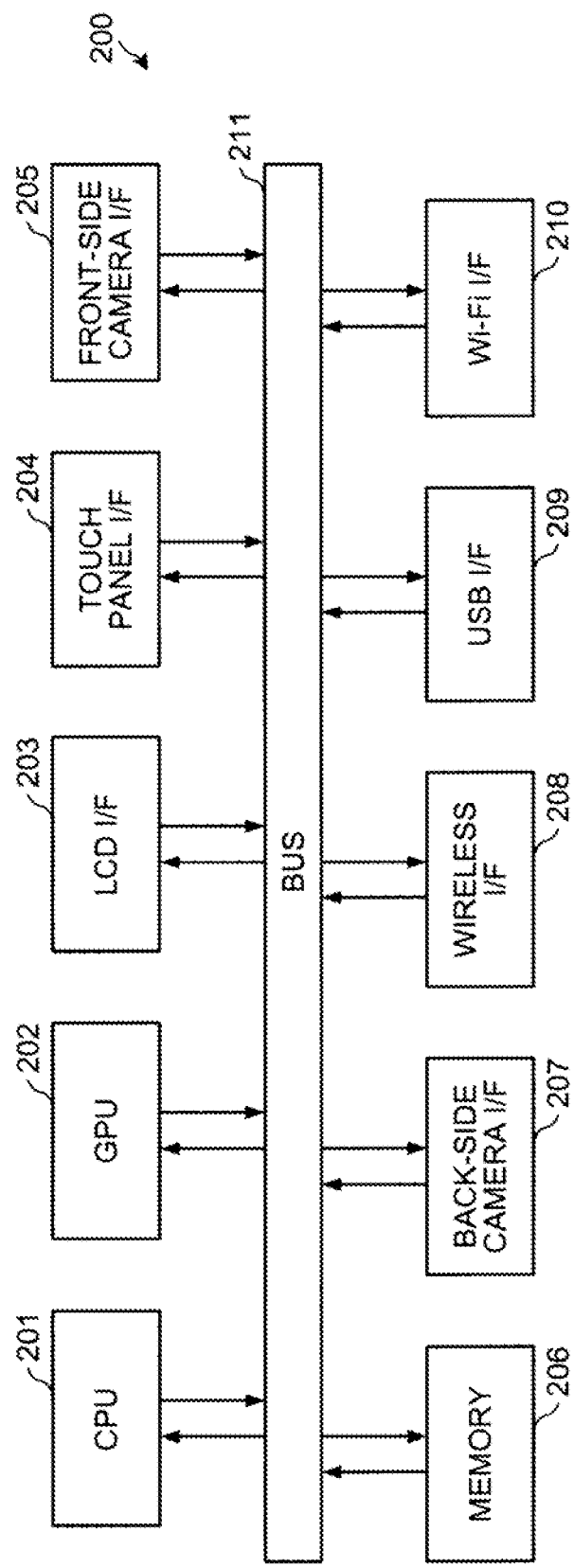
FIG. 2 is a block diagram of hardware of a portable terminal device 200 according to the embodiments.

FIG. 2 is a block diagram of hardware of a portable terminal device 200 according to the embodiment. The portable terminal device 200 includes a multi-core central processing unit (CPU) 201 and a graphics processing unit (GPU) 202. The portable terminal device 200 also includes a liquid crystal display (LCD) I/F 203, a touch panel I/F 204, a front-side camera I/F 205, a memory 206, a back-side camera I/F 207, a wireless I/F 208, a universal serial bus (USB) I/F 209, and a wireless fidelity (Wi-Fi) I/F 210.

FIG. 2 does not depict devices that are connected through the LCD I/F 203, the touch panel I/F 204, the front-side camera I/F 205, the back-side camera I/F 207, the wireless I/F 208, the USB I/F 209, and the Wi-Fi I/F 210. The components (the GPU 202 to the Wi-Fi I/F 210) are respectively connected by a bus 211 and under the control of the CPU 201, mutually transmit and receive data.

The CPU 201 is a central processing device that governs the overall control of the portable terminal device 200. The CPU 201 may be a multi-core processor having multiple cores. The GPU 202 executes computing processes that are specific to graphic processing. The LCD I/F 203 is an I/F with a liquid crystal display. The liquid crystal display displays data such as a document, an image, and functional information, in addition to a cursor, icons, or tool boxes. The touch panel I/F 204 is an I/F with a touch panel. For example, when a user presses the touch panel, the touch panel I/F 204 determines that a mouse-click event has occurred and notifies the CPU 201 of the occurrence.

The front-side and the back-side camera I/Fs 205 and 207 are I/Fs each having a camera. The memory 206 includes a main storage device and an auxiliary storage device. For example, the memory 206 includes storage devices such as Read-Only Memory (ROM), Random Access Memory (RAM), and flash ROM. The ROM stores therein programs such as a boot program. The RAM is used as a work area of the CPU 201. The flash ROM stores therein system software such as an OS; application software; and images, moving images, etc., obtained by a front-side and a back-side cameras.

The wireless I/F 208 is an I/F having a wireless device such as an antenna. The USB I/F 209 is an I/F having a peripheral device that supports the USB standard. The peripheral device can be, for example, a recording medium such as flash memory such as an "SD card (a registered trademark)". The Wi-Fi I/F 210 is an I/F having a wireless LAN device that supports the common standards of wireless LANs "IEEE 802.11 a/IEEE 802.11b".

Figure 3:
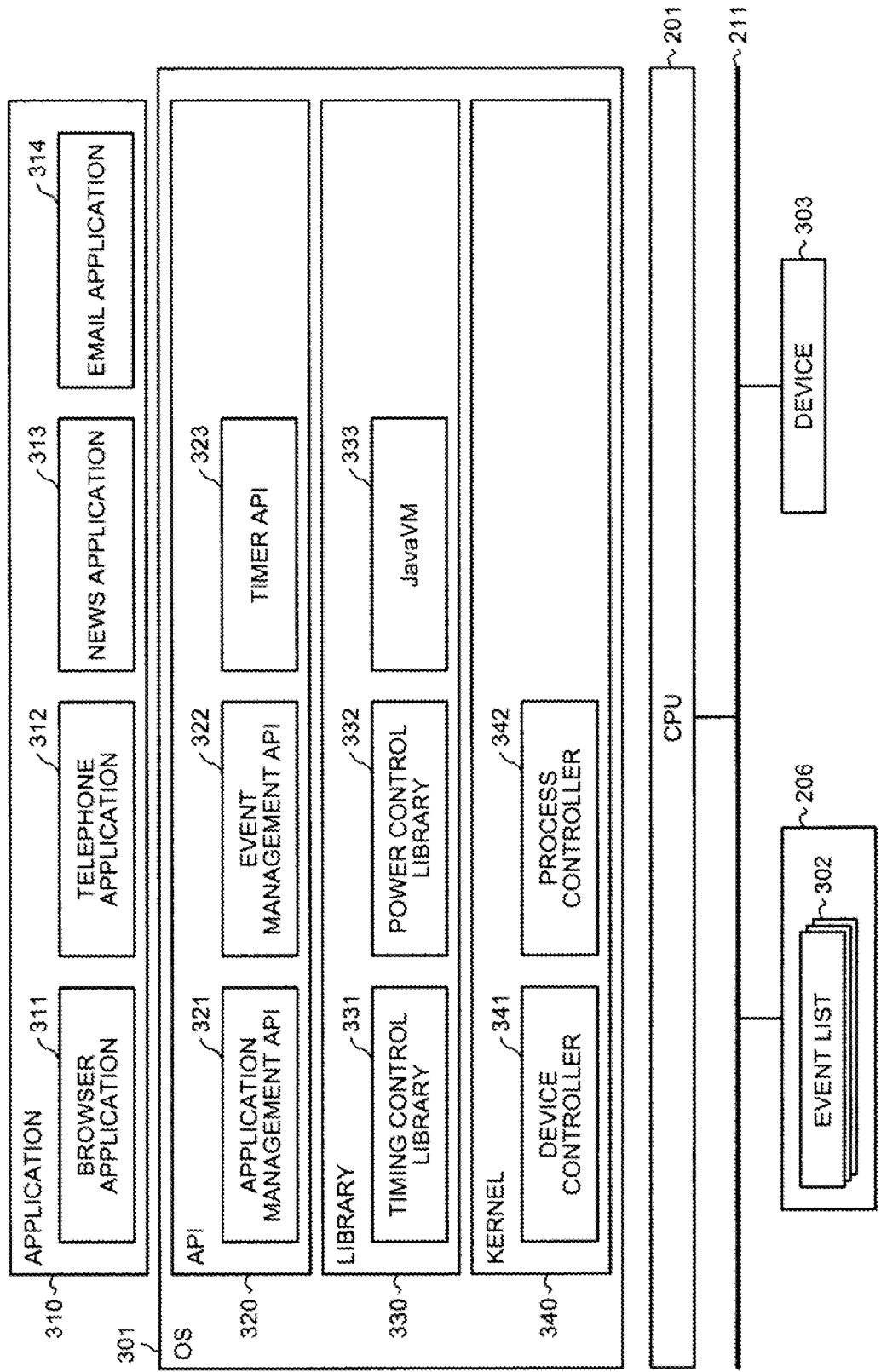
FIG. 3 is a block diagram of software of a portable terminal device 200.

FIG. 3 is a block diagram of software of the portable terminal device 200. The portable terminal device 200 includes an application 310, an application program interface (API) 320, a library 330, and a kernel 340. The API 320 to the kernel 340 are for an OS 301.

The application 310 includes a browser application 311, a telephone application 312, a news application 313, an email application 314, etc. The browser application 311 is an application that communicates through the Wi-Fi I/F 210, etc., and that is mainly used to view webpages acquired under the HyperText Transfer Protocol (HTTP). The telephone application 312 is an application that connects to a base station by the wireless I/F 208 and makes a call to another portable terminal device, a fixed telephone, etc. The news application 313 is an application that communicates through the Wi-Fi I/F 210, etc., and that is used to view network news acquired under the Network News Transfer Protocol (NNTP).

The email application 314 is an application that communicates through the Wi-Fi I/F 210, etc., and that transmits and receives emails under the Simple Mail Transfer Protocol (SMTP), the Post Office Protocol (POP), etc. It is assumed that the applications included in the application 310 according to the embodiment are respectively executed as one process. For example, the browser application 311 is one process and the telephone application 312 is another one process. However, the application 310 may include an application that is executed as multiple processes.

The API 320 is a part of the functions of the OS 301 and is an interface for the application 310 to access the library 330 supplied by the OS 301. The API 320 includes an application management API 321, an event management API 322, a timer API 323, etc.

The application management API 321 executes a starting process, an ending process, and a switching process for the application 310 displayed on the liquid crystal display. The event management API 322 is a feature of the embodiment and corrects the scheduled starting time of an event to be executed by the application 310, based on an event list 302 registering therein the events to be executed after the current time and power information of the portable terminal device 200. An example of the contents of the event list 302 will be described with reference to FIG. 5.

For example, the event management API 322 corrects the scheduled starting time of an event that is based on a re-reading interval designated by an HTML, etc., of a webpage in the browser application 311, and the interval of an email inquiry to a POP server of the email application 314. The event management API 322 also acquires the event list 302 and the power information from the library 330. The timer API 323 supplies time information when the timer API 323 is invoked by the application 310, the event management API 322, etc.

The library 330 is a part of the functions of the OS 301 and depicts a group of services that are available to the application 310. The library 330 includes a timing control library 331, a power control library 332, and a Java (a registered trademark) virtual machine (VM) 333.

The timing control library 331 has a function of acquiring the time information such as, for example, the current time, according to a request from the timer API 323. The power control library 332 acquires the power information according to a request from the event management API 322. The Java VM 333 is a library that is executable on the portable terminal device 200 when any one execution object of the application 310 is not described in the native code machine language of the portable terminal device 200, but rather, is described using an intermediate code of Java. If all the applications in the application 310 are described using the native code, the Java VM 333 may be omitted.

The kernel 340 is software that is the core of the OS 301. The kernel 340 includes a device controller 341 and a process controller 342. The device controller 341 has a function of controlling the device 303 connected to the portable terminal device 200.

The device 303 is, for example, a Direct Memory Access Controller (DMAC) that is a device that controls data transfer instead of the CPU 201 in the portable terminal device 200. The device 303 is, for example, a liquid crystal display connected to the LCD I/F 203; a camera connected to the front-side or the back-side camera I/F 205 or 207; or an antenna connected to the Wi-Fi I/F 210. The device 303 includes a recording medium such as flash memory connected to the USB I/F 209.

For example, the device controller 341 controls the liquid crystal display by accessing the LCD I/F 203. The process controller 342 has a function of controlling the process executed in the portable terminal device 200. For example, the process controller 342 allocates the process executed by the application 310 to the CPU 201 based on priority, time sharing, etc.

Figure 4:
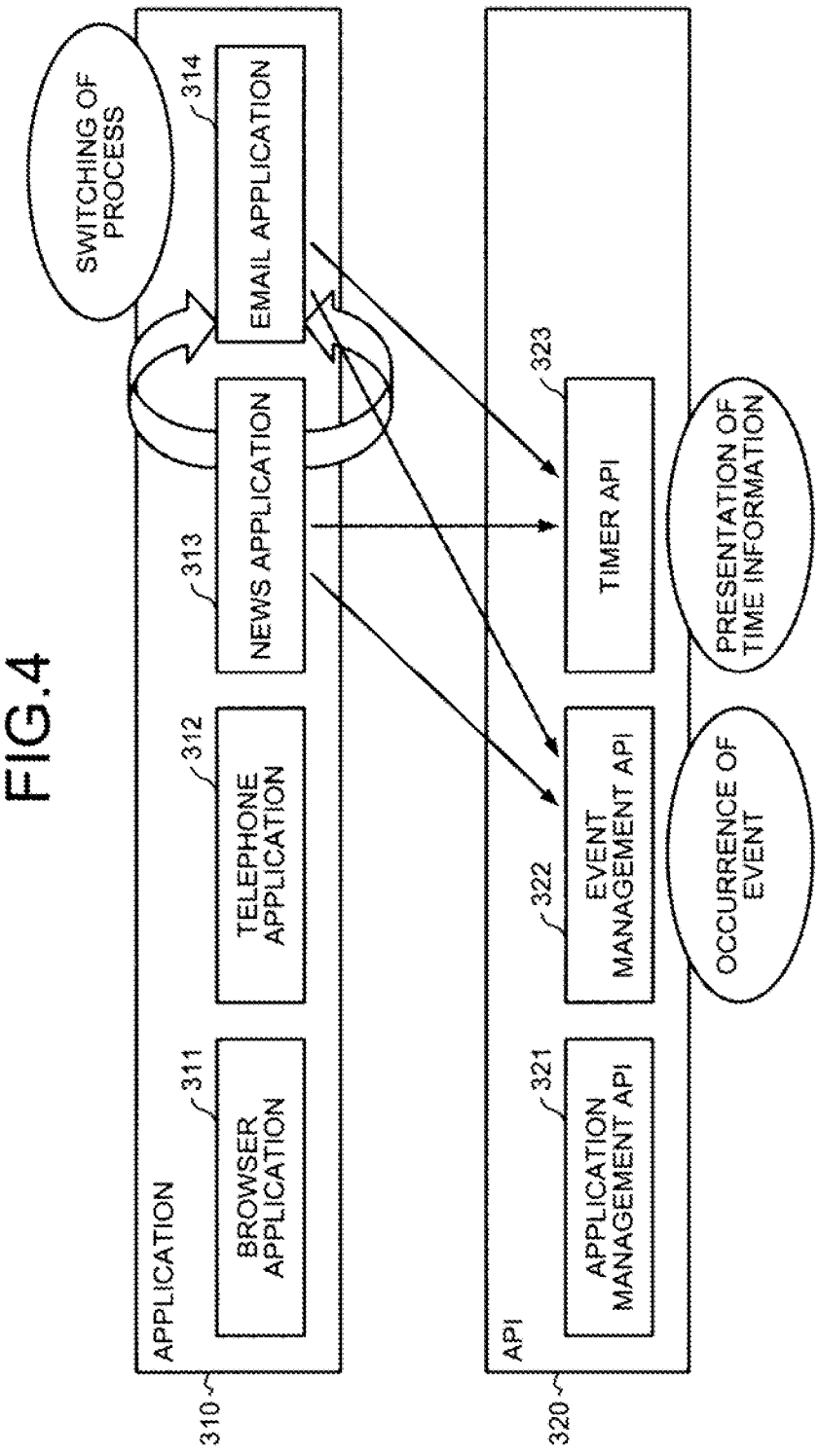
FIG. 4 is an explanatory diagram of an example where an application 310 is caused to operate at a scheduled starting time that has been corrected by an event management API 322.

FIG. 4 is an explanatory diagram of an example where the application 310 is caused to operate at a scheduled starting time that has been corrected by the event management API 322. FIG. 4 is a diagram depicts the application 310 and the API 320 from FIG. 3.

The process controller 342 executes switching of the process for the news application 313 and the email application 314. When the news application 313 and the email application 314 notify the event management API 322 of an event execution request, the event management API 322 corrects the scheduled starting time of the next event. When the timer API 323 supplies the time information and the corrected scheduled starting time has arrived, the event management API 322 notifies the application 310 (source of the execution request) that the scheduled starting time of the event has arrived and the application 310 executes the event.

Figure 5:
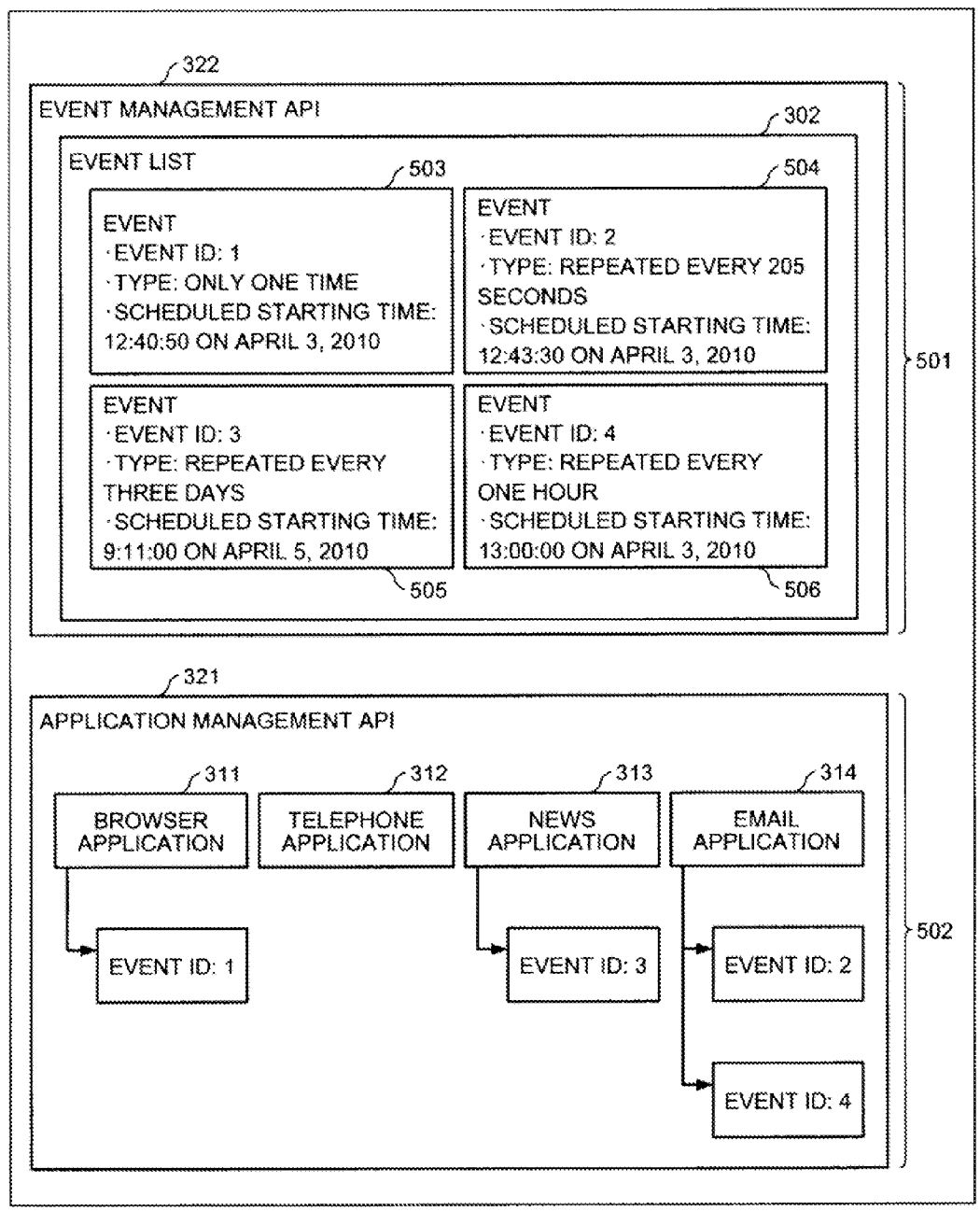
FIG. 5 is an explanatory diagram of an example of the processing content of the event management API 322 and an application management API 321.

FIG. 5 is an explanatory diagram of an example of the processing content of the event management API 322 and the application management API 321. The event management API 322 manages the event list 302 and the application management API 321 retains information that indicates the relationship between an event and the application 310. A reference numeral "501" denotes the retention state of the event list 302 by the event management API 322 at the current time of "12:40:40 on Apr. 3, 2010". A reference numeral "502" denotes the relationship between an event and the application 310 by the application management API 321.

In the retention state 501, the event list 302 is managed by the event management API 322 and is a list of events that each occur at the time point designated as a trigger by the application 310. The events include types that occur only once and types that are regularly repeated. In the retention state 501, events 503 to 506 are registered in the event list 302.

An "event" in the list includes three fields that include an "event ID", a "type", and a "scheduled starting time". The event Id field stores therein an ID that is correlated with the application 310. The type field stores therein information indicating whether the event occurs only once or is regularly repeated. When the event is a regularly repeated event, the type field also stores therein information indicating at what intervals the event is executed. The scheduled starting time field stores therein the time point at which the event is executed next.

As indicated by reference numeral "502", the application management API 321 stores therein pointers of the application 310. Each of the pointers is correlated with an event ID registered in the event list 302. For example: the browser application 311 is correlated with an event ID: 1; the telephone application 312 is correlated with no event; the news application 313 is correlated with an event ID: 3; and the email application 314 is correlated with an event ID: 2 and an event ID: 4.

For example, the browser application 311 executes the event 503 whose event ID is "1" at "12:40:50 on Apr. 3, 2010". When the event 503 is an event to re-read a specific webpage, the browser application 311 re-reads the webpage at the scheduled starting time.

Similarly, the news application 313 executes the event 505 whose event ID is "3" at "9:11:00 on Apr. 5, 2010". When the event 505 is an event to acquire network news contributed after the previous acquisition, the news application 313 acquires the network news at the scheduled starting time designated. The event 505 is an event that repeatedly occurs and therefore, a new event is added to the event list 302 that is scheduled to be executed at "9:11:00 on Apr. 8, 2010" that is three days after the event 505 comes to an end.

Similarly, the email application 314 executes the event 504 whose event ID is "2" at "12:43:30 on Apr. 3, 2010" and executes the event 506 whose event ID is "4" at "13:00:00 on Apr. 3, 2010". In this case, it is assumed that the email application 314 is software that corresponds to a multi-account. When the events 504 and 506 are events to check respective email accounts for new email, the email application 314 executes the check at the scheduled starting time designated. Thus, one application may generate multiple events. Further, the processing content of each of the events generated may be identical or may differ from one another.

The events 504 and 506 are both events that repeatedly occur and therefore, a new event is registered in the event list 302 after the respective event comes to an end. For example, after the event 504 comes to an end, a new event is registered in the event list 302. The new event is scheduled to be executed at "12:46:55 on Apr. 3, 2010", which is 205 seconds after the starting time of the event 504. After the event 506 comes to an end, a new event is registered in the event list 302. The new event is scheduled to be executed at "14:00:00 on Apr. 3, 2010", which is one hour after the starting time of the event 506.

Figure 6:
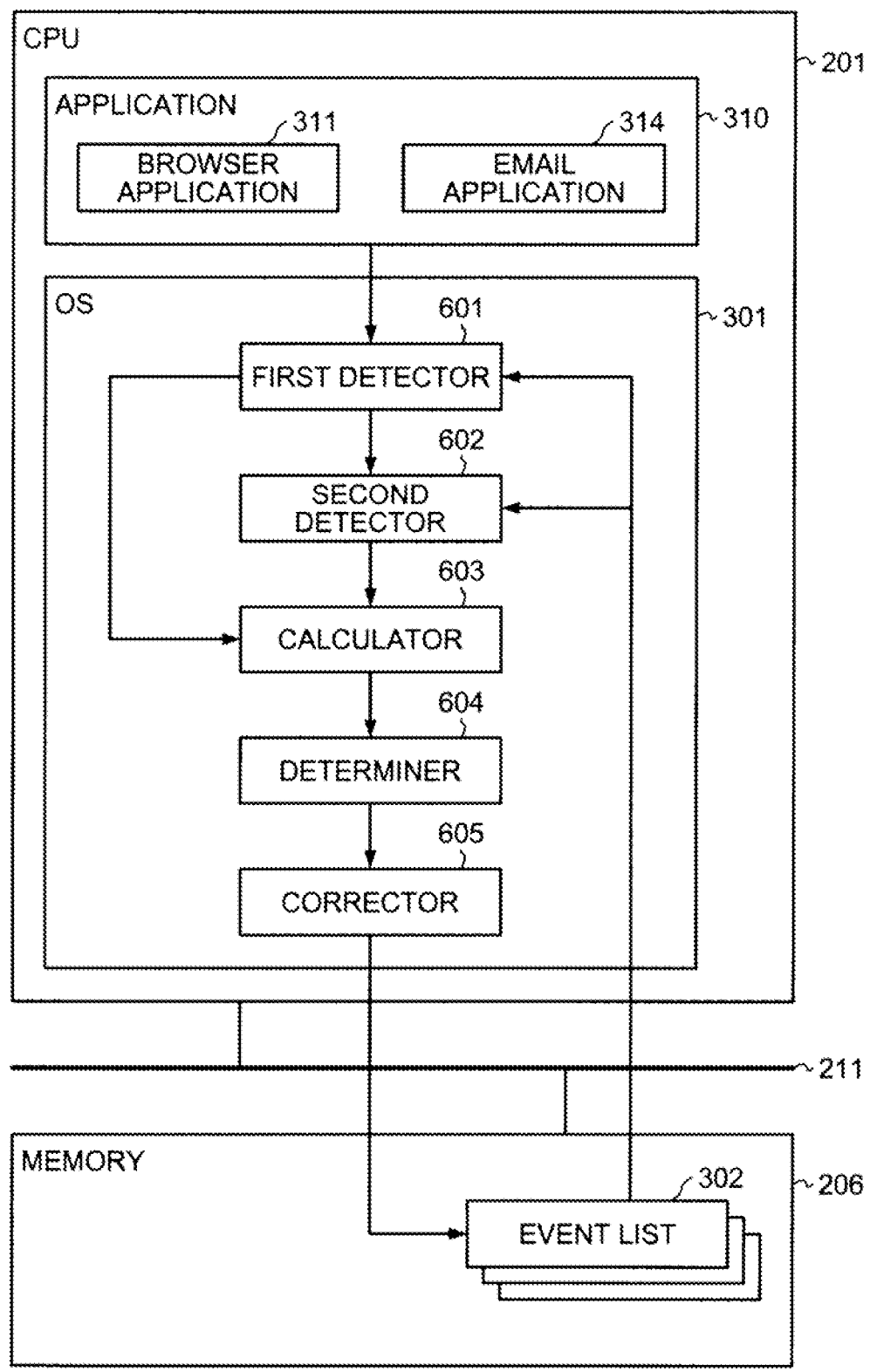
FIG. 6 is a block diagram of an exemplary functional configuration of the portable terminal device 200.

FIG. 6 is a block diagram of an exemplary functional configuration of the portable terminal device 200. The portable terminal device 200 includes a first detector 601, a second detector 602, a calculator 603, a determiner 604, and a corrector 605. The functions (the first detector 601 to the corrector 605) constituting a controller are implemented by the CPU 201 executing programs stored in a storage device. For example, the storage device is, for example, the memory 206 depicted in FIG. 2; a recording medium connected to the USB I/F 209; etc. Processing results of the functional units (the first detector 601 to the corrector 605) are stored to a storage device such as, for example, the memory 206 depicted in FIG. 2; the recording medium connected to the USB I/F 209; etc.

The first detector 601 detects the scheduled starting time of an event to be corrected, which is executed at the current time or thereafter. In this case, the "event to be corrected" is an event whose scheduled starting time is to be corrected. For example, the first detector 601 detects the scheduled starting time of an event to be corrected that occurs from a process and that is executed at the current time or thereafter. The first detector 601 may detect the scheduled starting time of the event to be corrected, from among a group of events registered in the event list 302.

The second detector 602 detects, in processing contents that are different from that of the event detected by the first detector 601, the scheduled starting time of each event to be executed at the current time or thereafter. An event for which the processing contents are different from that of the event to be corrected, is an event executed by a process different from the process that executes the event to be corrected.

For example, the second detector 602 detects the scheduled starting time of each event of the group of events registered in the event list 302. The second detector 602 may detect the scheduled starting time of an event that is not registered in the event list 302 and that is estimated based on the scheduled starting time of each event of the group of events registered in the event list 302 and the type and the scheduled starting time of each event.

For example, the second detector 602 detects the scheduled starting time "12:43:30 on Apr. 3, 2010" of the event 504 that is registered in the event list 302, and also detects the scheduled starting time of the event that is not registered in the event list 302 and that is estimated to be repeated after the scheduled starting time of the event 504 detected, based on the type "repeated every 205 seconds" of the event 504. For example, the scheduled starting time of an event executed subsequent to the event 504 is "12:43:30+205 seconds on Apr. 3, 2010".

However, configuration may be such that the second detector 602 detects only the events that are executed after the current time and within a predetermined time period including the scheduled starting time. The "predetermined time period" is, for example, a time period that spans from the current time CT to a time acquired by adding the scheduled starting time of the event to be corrected and the polling interval of the event to be corrected. The predetermined time period may be a time period that spans from the current time to the scheduled starting time of the event to be corrected or may be a time period that spans from the scheduled starting time of the event to be corrected to a time acquired by adding the scheduled starting time of the event to be corrected and the polling interval of the event to be corrected.

The calculator 603 calculates the difference between the scheduled starting time of the event to be corrected detected by the first detector 601 and the scheduled starting time of each event detected by the second detector 602. For example, the calculator 603 calculates as the difference, the absolute value acquired by subtracting the scheduled starting time of the event detected by the first detector 601 from the scheduled starting time of each event detected by the second detector 602.

The determiner 604 determines the target event for the event to be corrected, from among the events to be executed at the current time or thereafter, based on the group of differences calculated by the calculator 603. The "target event" refers to an event to be the target for bringing closer thereto, the scheduled starting time of the event to be corrected. For example, the determiner 604 determines as the target event, an event whose difference calculated by the calculator 603 is smallest, among the events detected by the second detector 602. Thereby, the determiner 604 is able to determine as the target event, the event whose interval to the scheduled starting time of the event to be corrected is shortest.

For example, the determiner 604 determines as the target event, the event whose difference calculated by the calculator 603 is equal to or smaller than a predetermined threshold value, among the events detected by the second detector 602. Thereby, the determiner 604 is able to determine as the target event, the event whose interval to the scheduled starting time of the event to be corrected is equal to or smaller than the predetermined threshold value.

Consequently, the information processing apparatus is able to exclude from those for determining the target event, an event started at a time that is far away from the scheduled starting time of the event to be corrected. Therefore, the information processing apparatus is able to determine to execute no correction when the event to be the target event is only present far away from the event to be corrected and no reduction of power consumption is expected.

For example, when the corrector 605 executes the correction within the scope that the corrector 605 complies with constraining information of the event to be corrected, a case may be present where an event whose interval to the scheduled starting time of the event to be corrected is shortest, is unable to comply with the constraining information of the event to be corrected. In this case, the determiner 604 is able to select an event that is able to comply with the constraining information of the events whose intervals to the scheduled starting time of the event to be corrected is equal to or shorter than the predetermined threshold value, and determine the event selected to be the target event. The "constraining information" is information that is based on the specification of an application that executes the event and is information that constrains the polling interval. For example, the constraining information is a lower limit value or an upper limit value of the polling interval.

For example, the case is assumed where each event of a group of events executed by a process is determined as the event to be corrected and the scheduled starting time of each of the events to be corrected is sequentially corrected. In this case, the determiner 604 may select the target event from the events whose intervals are equal to or shorter than the predetermined threshold value, such that the average polling interval after the correction is brought close to the polling interval before the correction.

For example, the determiner 604 determines as the target event an event whose difference calculated by the calculator 603 is equal to or larger than a predetermined threshold value, among the events detected by the second detector 602. Thereby, the determiner 604 is able to exclude from those for determining the target events, an event whose interval to the scheduled starting time of the event to be corrected is short.

For example, the determiner 604 determines as the target event, an event whose rank is within a predetermined rank when the events detected by the second detector 602 are arranged in ascending order of the difference calculated by the calculator 603. Thereby, the determiner 604 is able to determine as the target event, an event whose scheduled starting time is close to that of the event to be corrected among the events, regardless of the size of the interval to the scheduled starting time of the event to be corrected.

The corrector 605 corrects the scheduled starting time of the event to be corrected such that the interval between the scheduled starting time of the event to be corrected and that of the target event determined by the determiner 604 becomes short. For example, the corrector 605 corrects the scheduled starting time of the event to be corrected such that the execution time period of the device 303, triggered by the target event and that of the device 303, triggered by the event to be corrected overlap with each other. Thereby, the corrector 605 is able to bundle the execution time period of the device 303, triggered by the event to be corrected before the correction and that of the device 303, triggered by the target event and thereby, facilitate lower power consumption of the portable terminal device 200 by reducing the execution time period of the device 303.

The corrector 605 corrects the scheduled starting time of the event to be corrected, based on the power consumption of the event to be corrected or the target event. For example, the corrector 605 executes the correction such that the interval between the scheduled starting times of the event to be corrected and the target event becomes shorter as the power consumption of any one of the events is larger. Thereby, the information processing apparatus is able to reduce the power consumption of the application that significantly affects the power consumption. When the power consumption of the event is small, the polling interval before the correction is prioritized and the information processing apparatus is able to more easily comply with the constraining information.

The corrector 605 corrects the scheduled starting time of the event to be corrected, based on the remaining power level that the information processing apparatus retains. The remaining power level is indicated by, for example, an index value that varies from zero to one. When the index value is zero, this indicates a completely discharged state representing that no power remains. When the index value is one, this indicates a fully charged state.

For example, the corrector 605 corrects the scheduled starting time of the event to be corrected such that the interval between the scheduled starting time of the event to be corrected and that of the target event becomes shorter as the remaining power level is smaller. Thereby, when the remaining power level is small, the corrector 605 is able to suppress power consumption. When the remaining power level is large, the corrector 605 has to prioritize the polling interval before the correction and is able to more easily comply with the constraining information.

The corrector 605 corrects the scheduled starting time of the event to be corrected within the scope that the constraining information of the event to be corrected is complied with.

For example, the corrector 605 modifies the scheduled starting time after the correction of the event to be corrected, based on the constraining information determined in advance. A minimal value is assumed for a re-reading interval for a specific webpage, as a specification of the polling interval of the process concerning the browser application 311. In this case, when the scheduled starting time of the target event lowers the value acquired by adding the lower limit value of the re-reading interval for the specific webpage to the current time CT, the corrector 605 corrects the scheduled starting time of the event to be corrected, to be the value acquired by adding the lower limit value of the re-reading interval for the specific webpage to the current time CT.

The corrector 605 corrects the scheduled starting time of the event to be corrected, to be the scheduled starting time of the target event. Thereby, the corrector 605 causes the scheduled starting time of the event to be corrected, to coincide with the scheduled starting time of the target event. Therefore, when the device 303 is simultaneously usable for multiple processes, the processes of the event to be corrected and of the target event simultaneously use the device 303. Therefore, the corrector 605 is able to bundle the execution time period of the device 303, triggered by the event to be corrected and the execution time period of the device 303, triggered by the target event and thereby, facilitate lower power consumption of the portable terminal device 200 by reducing the execution time period of the device 303.

When the device 303 is not simultaneously usable for multiple processes, either event among the event to be corrected and the target event uses the device 303, while the other event waits for the execution of the event to come to an end. Therefore, the corrector 605 is able to start the execution of the other event when the execution of the event comes to an end.

The corrector 605 is able to cause the other event to start before the device 303 used by the event enters the idle time period thereof, whereby the execution time periods of the device 303 can be bundled. Therefore, the corrector 605 is able to bundle the execution time period of the device 303, triggered by the event to be corrected before the correction and the execution time period of the device 303, triggered by the target event and thereby, facilitate lower power consumption of the portable terminal device 200.

The corrector 605 corrects the scheduled starting time of the event to be corrected, to be the time acquired by adding the estimated processing time period of the target event to the scheduled starting time of the target event, based on the scheduled starting time of the target event and the estimated processing time period thereof. The "estimated processing time period of the target event" is the processing time period that is estimated from the processing time period of the event executed at the current time or subsequently by the process that executes the target event. The "the time acquired by adding the estimated processing time period of the target event to the scheduled starting time of the target event" is the scheduled ending time of the target event.

Thereby, the corrector 605 is able to cause the execution of the event to be corrected to start at the time at which the execution of the target event comes to an end. The corrector 605 is able to cause the event to be corrected to start before the device 303 used by the target event enters the idle time period thereof. Therefore, the corrector 605 is able to bundle the execution time period of the device 303, triggered by the event to be corrected before the correction and that of the device 303, triggered by the target event and thereby, facilitate the lower power consumption of the portable terminal device 200 by reducing the execution time period of the device 303.

Based on the scheduled starting time of the target event and the estimated processing time period of the event to be corrected, the corrector 605 corrects the scheduled starting time of the event to be corrected to be the time acquired by subtracting the estimated processing time period of the event to be corrected from the scheduled starting time of the target event. The "estimated processing time period of the event to be corrected" is the processing time period that is estimated from the processing time period of the event executed at or before the current time by the process that executes the event to be corrected. The "time acquired by subtracting the estimated processing time period of the event to be corrected from the scheduled starting time of the target event" is the scheduled starting time of the event to be corrected acquired when the scheduled ending time of the event to be corrected is caused to coincide with the scheduled starting time of the target event.

Thereby, the corrector 605 is able to cause the execution of the target event to start at the time when the execution of the event to be corrected comes to an end. The corrector 605 is able to cause the target event to start before the device 303 used by the event to be corrected enters the idle time period. Therefore, the corrector 605 is able to bundle the execution time period of the device 303, triggered by the event to be corrected before the correction and the execution time period of the device 303, triggered by the target event, to facilitate lower power consumption by the portable terminal device 200 by reducing the overall execution time period of the device 303.

When the determiner 604 does not determine a target event, the corrector 605 executes no correction. Consequently, the corrector 605 executes no correction when the constraining information cannot be complied with, and is able to cause the processes to operate at ideal polling intervals.

The content of the correction of the scheduled starting time of the event to be corrected according to a first example will be described. The first example is an example of correcting the scheduled starting time of the event to be corrected to be the scheduled starting time of the target event. In the first example, the device 303 used by the applications 1 to 3 is simultaneously usable for the applications 1 to 3.

FIGS. 7 to 13 are explanatory diagrams of the contents of the correction of the scheduled starting time of an event to be corrected according to the first example. In the portable terminal device 200, the application 310 does not independently set the scheduled starting time of an event and the OS 301 corrects the scheduled starting time to be a proper scheduled starting time, based on a value supplied from the application 310. The application 310 may correct the scheduled starting time of the event, based on the scheduled starting time calculated by the OS 301.

An example will be described of a calculation equation for the correction of the scheduled starting time in the first example. The event management API 322 first calculates the scheduled starting time before the correction of the event to be corrected according to equation (1) below.

$$INP = CT + T \quad (1)$$

Where, "INP" denotes the scheduled starting time before the correction of the event to be corrected. "CT" denotes the current time. "T" denotes the polling interval of the application. The event management API 322 corrects the scheduled starting time of the event to be corrected according to equation (2) below.

$$FPT = INP + (PT(n) - INP) \times BL \times (1/PAL) \quad (2)$$

Where, "FPT (Fixed Polling Time)" denotes the scheduled starting time after the correction of the event to be corrected. "PT(n)" denotes the scheduled starting time of an event that is determined as the target event, among the events to be executed within a predetermined time period at or after the current time CT.

"PAL (Power Api Level)" denotes an index of the power consumption of the application. The index of the power consumption indicates the largest power consumption when the index is "one" and indicates a smaller power consumption as its value becomes larger. For example, PAL is able to be calculated according to equation (3) below.

$$PAL = \text{(the power consumption consumed when the load on the CPU 201 is 100\%/the power consumption of the application)} \quad (3)$$

In a case where the power consumption is, for example, 3 [mW] when the load on the CPU 201 is 100%, by applying equation (3), for an application that consumes 3 [mW], the index of power consumption is (3/3)=1. Similarly, for an application that consumes 1 [mW], the index of power consumption is (3/1)=3.

"BL (Battery Life)" denotes the remaining power level of the portable terminal device 200. For example, BL is a value that varies from zero to one and when BL is zero, this indicates a completely discharged state representing that no power remains and, when BL is one, this indicates a fully charged state.

The event management API 322 may correct the scheduled starting time of the event to be corrected, based on the constraining information (for example, a threshold value such as the upper limit value or the lower limit value of the scheduled starting time). For example, a minimal value of the re-reading interval for a specific webpage is assumed as a specification of the polling interval of the browser application 311. In this case, the lower limit value of the scheduled starting time is set to be the value acquired by adding the minimal value of the re-reading interval to the current time CT. When the calculation result of equation (2) is smaller than the lower limit value, the event management API 322 may employ the lower limit value without employing the calculation result of equation (2), as the scheduled starting time after the correction.

In this manner, the scheduled starting time of the event to be corrected after the correction is calculated based on the difference between the scheduled starting time of the event to be corrected and the scheduled starting time of the target event (PT(n)−INP). When only one event is present, the event management API 322 executes no correction because no PT(n) is present. Therefore, the scheduled starting time of the corresponding event is equal to a time "CT−T" and the polling interval is equal to the polling interval T that is determined by the application based on the specification, etc.

Configuration may be such that the event management API 322 corrects the scheduled starting time of the event to be corrected only when the interval between the event to be corrected and the target event is shorter than a predetermined threshold value. Conditional expression (4) is an example of a determination equation to determine whether the interval between the event to be corrected and the target event is shorter or longer than the predetermined threshold value.

$$|FPT - PT(n)| < Th \times BL \times (1/PAL) \quad (4)$$

Where, "Th" is a constant. When conditional expression (4) is satisfied, FPT of equation (2) is determined as the scheduled starting time after the correction of the event to be corrected. On the other hand, when conditional expression (4) is not satisfied, INP of equation (1) is determined as the scheduled starting time after the correction of the event to be corrected.

Configuration may be such that the event management API 322 corrects the scheduled starting time of the event to be corrected only when the interval between the event to be corrected and the target event is longer than the predetermined threshold value. In this case, when conditional expression (4) is satisfied, INP of equation (1) is determined as the scheduled starting time after the correction of the event to be corrected. On the other hand, when conditional expression (4) is not satisfied, FPT of equation (2) is determined as the scheduled starting time after the correction of the event to be corrected.

An example of the correction of the scheduled starting time of the event to be corrected when the example 1 of the calculation equation for the correction is used will be described with reference to FIGS. 7 to 14. To simplify the description, when no designation of the date and the time is attached to an indication of the time in FIGS. 7 to 14, a time on Apr. 3, 2010. It is assumed that the BL is set to be "1" and the PAL is set to be "1". In the example, it is assumed that constraining information is present indicating that the polling interval must not be equal to or shorter than 45 seconds for the process 1.

Figure 7:
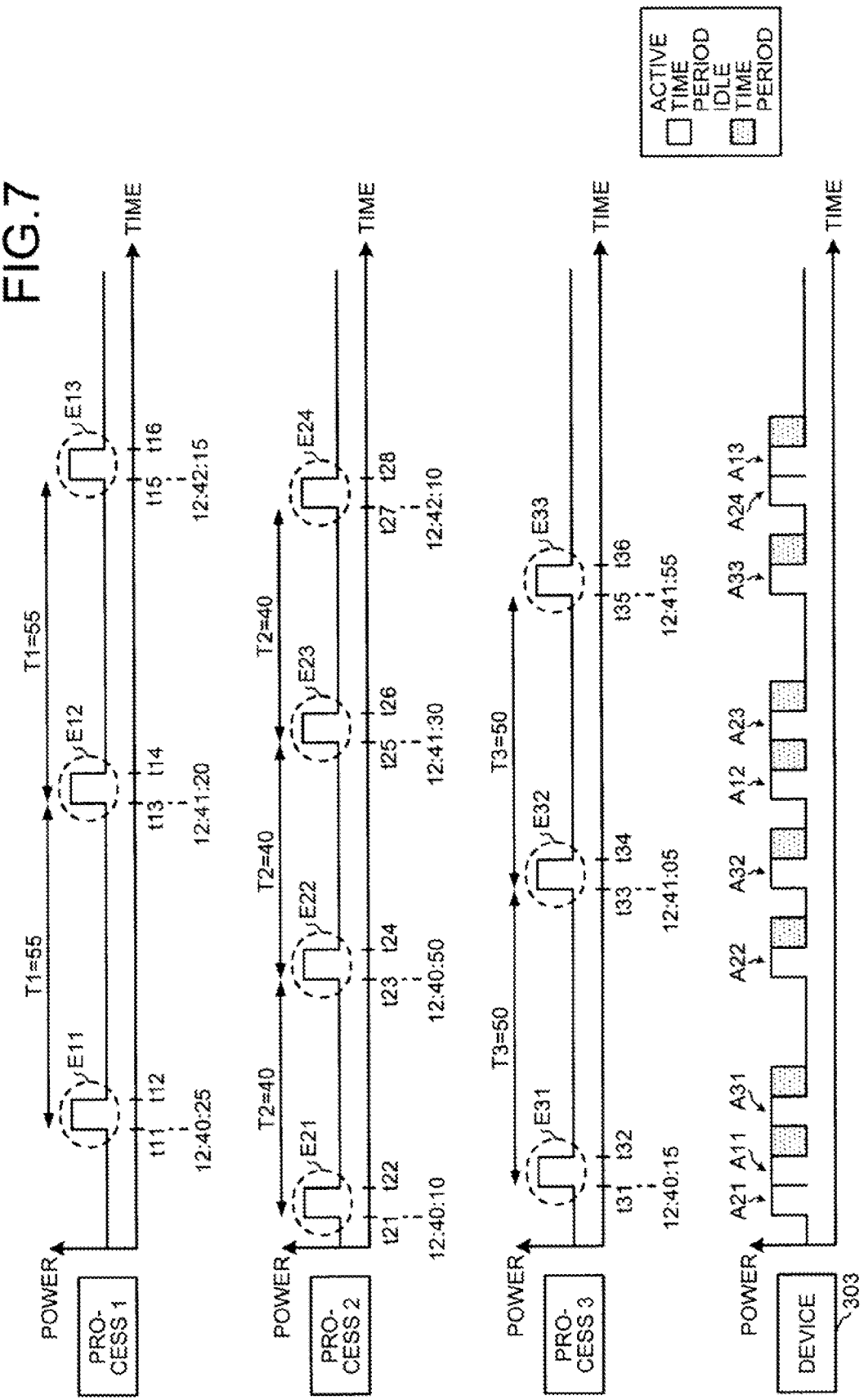
FIG. 7 depicts an example of correcting the scheduled starting time of an event according to the first example.

FIG. 7 depicts operations of the processes 1 to 3 and those of the device 303 before the correction is executed.

The process 1 executes an event every "polling interval T1=55" seconds. The process 1 before the correction is executed executes the event E11 at the time t11 (12:40:25), executes the event E12 at the time t13 (12:41:20), and executes the event E13 at the time t15 (12:42:15).

The process 2 executes an event every "polling interval T2=40" seconds. The process 2 before the correction is executed executes the event E12 at the time t12 (12:40:10), executes the event E22 at the time t23 (12:40:50), executes the event E23 at the time t25 (12:41:30), and executes the event E24 at the time t27 (12:42:10).

The process 3 executes an event every "polling interval T3=50" seconds. The process 3 before the correction is executed executes the event E31 at the time t31 (12:40:15), executes the event E32 at the time t33 (12:41:05), and executes the event E33 at the time t35 (12:41:55).

The device 303 starts execution with the processing of each event and enters a low power mode after a time period elapses that is acquired by totaling the active time period and the idle time period. Active time periods of the device 303 used for the processes of the events E11 to E13 are denoted by "A11 to A13". Active time periods of the device 303 used for the processes of the events E21 to E24 are denoted by "A21 to A24". Active time periods of the device 303 used for the processes of the events E31 to E33 are denoted by "A31 to A33".

Figure 8:
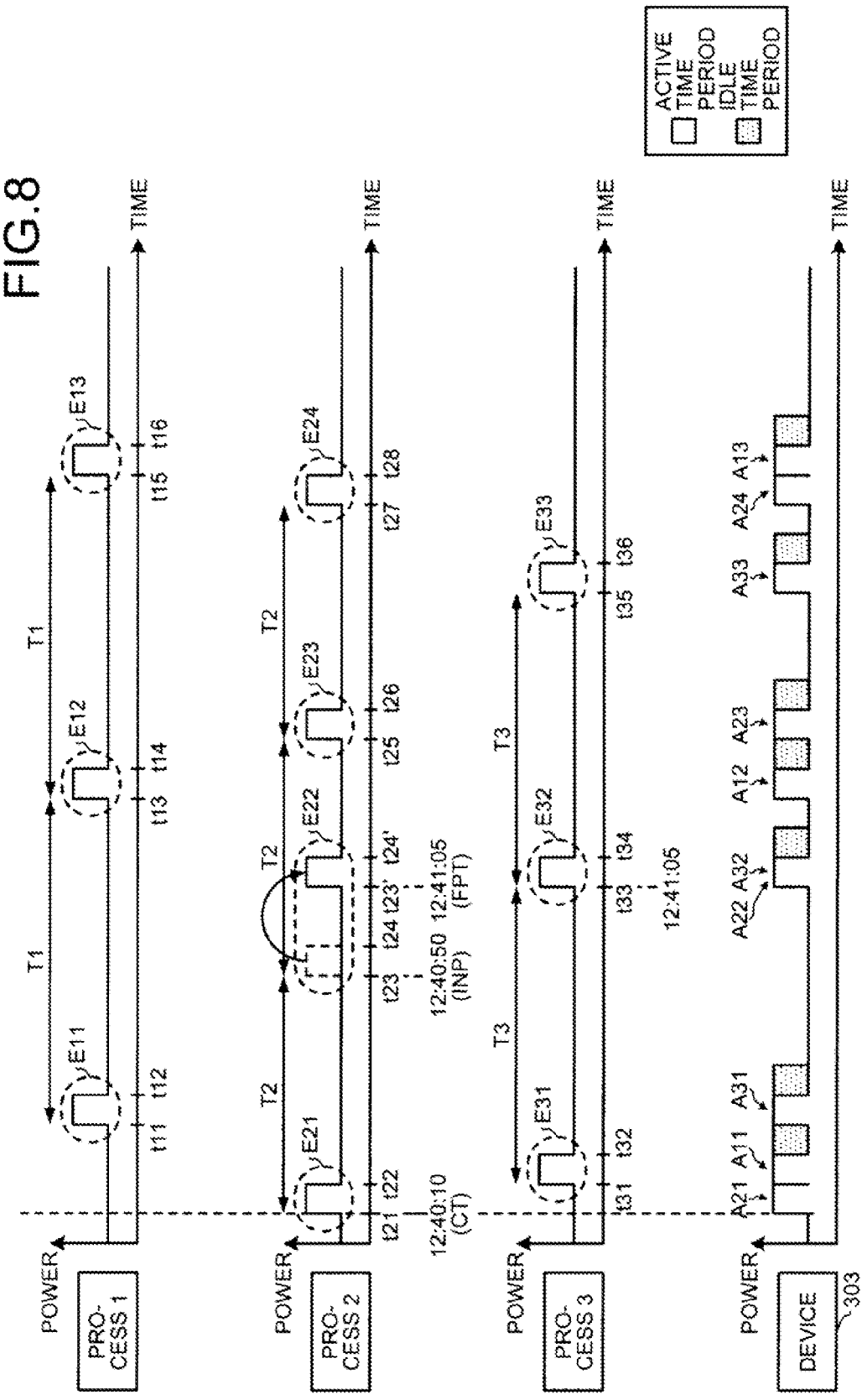
FIG. 8 depicts an example of correcting the scheduled starting time of an event according to a first example.

FIG. 8 depicts an example of correcting the scheduled starting time of the event E22 newly generated by the process 2 assuming that the time point at which the execution of the event E21 is started, is the current time CT.

The process 2 starts the execution of the event E21 at the time t21 (t21=12:40:10, the current time CT) and ends the execution at the time t22 (t22=12:40:15). When the event E22, whose execution starts at the time t23 (t23=12:40:50) after the poling interval T2 elapses, is generated from the process 2 at the time t21, the timing control library 331 starts correction processing for the event E22.

At the time t21, the events E11 and E31 are in the event list 302. Based on the scheduled starting time of the event E11 and the polling interval T1, the timing control library 331 calculates the respective scheduled starting times of the events E12 and E13, which are not registered in the event list 302. Similarly, based on the scheduled starting time of the event E31 and the polling interval T3, the timing control library 331 calculates the respective scheduled starting times of the events E32 and E33, which are not registered in the event list 302.

The timing control library 331 determines, as the target event, an event for which the interval between the scheduled starting time of the event and that of the event E22 is shortest, among the events E11 to E13 and E31 to E33. In this example, the event E32 is determined as the target event.

The event management API 322 uses equation (2) and calculates the scheduled starting time FPT (t23') to correct the event E22. The FPT is FPT=(the time t23)+(the time t33−the time t23)×1×1=12:40:50+(15)=12:41:05.

As the result of the calculation, the scheduled starting time of the event E22 is corrected from the time t23 (t23=12:40:50) to the time t23'(t23'=12:41:05). Consequent to this correction, the execution time period of the device 303, triggered by the event E22 and the execution time period of the device 303, triggered by the event E32 overlap with each other and the execution time periods of the device 303 can be bundled.

Figure 9:
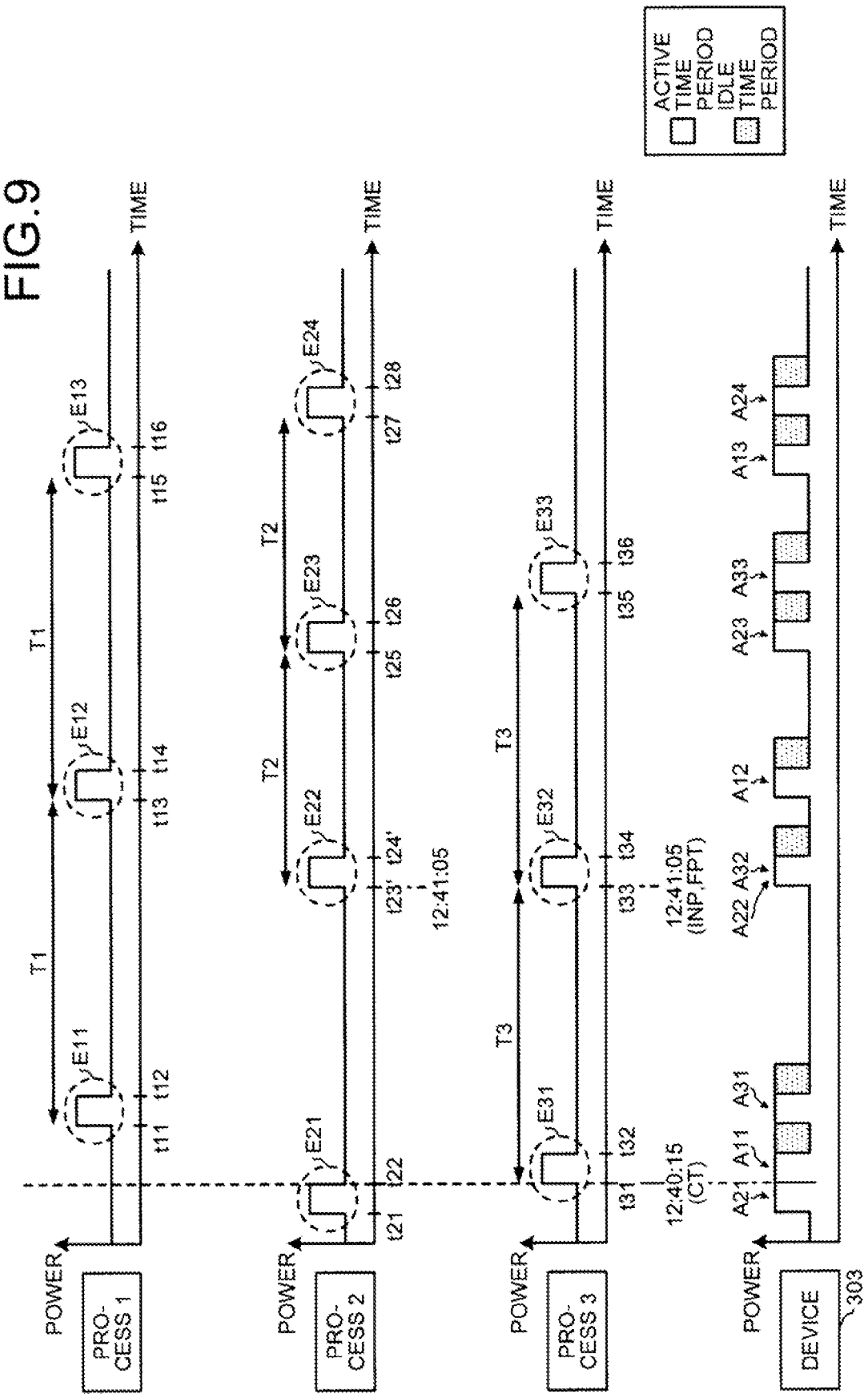
FIG. 9 depicts an example of correcting the scheduled starting time of an event according to the first example.

FIG. 9 depicts an example of correcting the scheduled starting time of the event E32 newly generated by the process 3 assuming that the time point at which the execution of the event E31 is started is the current time CT.

The process 3 starts the execution of the event E31 at the time t31 (t31=12:40:15, the current time CT) and ends the execution at the time t32 (t32=12:40:20). When the event E32, whose execution starts at the time t33 (t33=12:41:05) after the poling interval T3 elapses, is generated from the process 3 at the time t31, the timing control library 331 starts correction processing for the event E32.

At the time t31, the events E11 and E22 are in the event list 302. Based on the scheduled starting time of the event E11 and the polling interval T1, the timing control library 331 calculates the respective scheduled starting times of the events E12 and E13, which are not registered in the event list 302. Similarly, based on the scheduled starting time of the event E22 and the polling interval T2, the timing control library 331 calculates the respective scheduled starting times of the events E23 and E24, which are not registered in the event list 302.

The timing control library 331 determines, as the target event, an event for which the interval between the scheduled starting time of the event and that of the event E32 is shortest, among the events E11 to E13 and E22 to E24. In this example, the event E22 is determined as the target event.

The event management API 322 uses equation (2) and calculates the scheduled starting time FPT (t33') to correct the event E32. The FPT is FPT=(the time t33)+(the time t23'−the time t33)×1×1=12:41:05+(0)=12:41:05

As the result of the calculation, the scheduled starting time of the event E32 still remains to be the time t33 that is t33=12:41:05. In the case where the interval between the scheduled starting time of the target event and that of the event to be corrected is same as, or equal to or shorter than a predetermined threshold value, the operations described with reference to FIG. 9 can be omitted when it is determined that no correction is executed.

Figure 10:
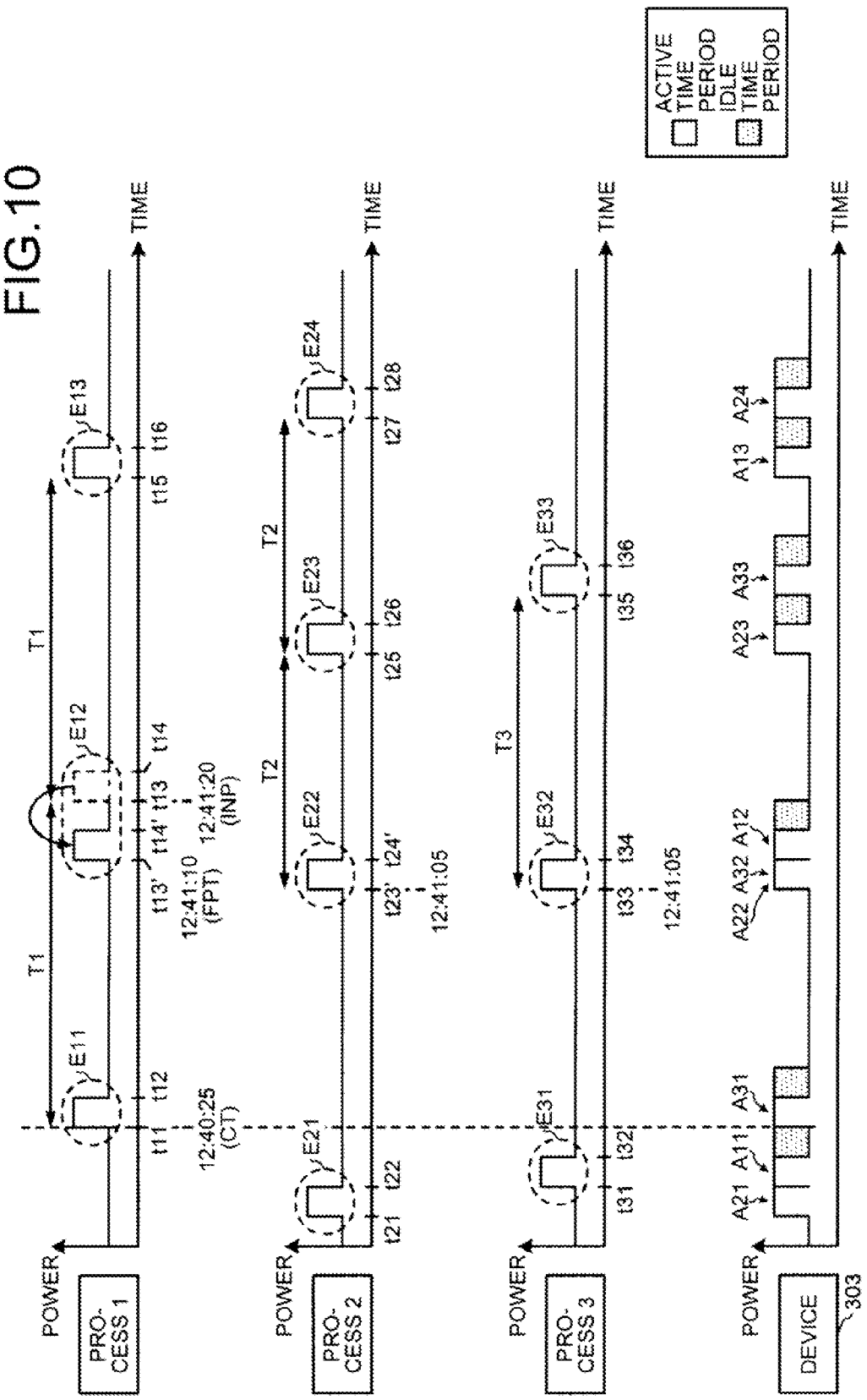
FIG. 10 depicts an example of correcting the scheduled starting time of an event according to the first example.

FIG. 10 depicts an example of correcting the scheduled starting time of the event E12 newly generated by the process 1 assuming that the time point at which the execution of the event E11 is started is the current time CT.

The process 1 starts the execution of the event E11 at the time t11 (t11=12:40:25, the current time CT) and ends the execution at the time t12 (t12=12:40:30). When the event E12, whose execution starts at the time t13 (t13=12:41:20) after the poling interval T1 elapses, is generated from the process 1 at the time t11, the timing control library 331 starts correction processing for the event E12.

At the time t11, the events E22 and E32 are in the event list 302. Based on the scheduled starting time of the event E22 and the polling interval T2, the timing control library 331 calculates the respective scheduled starting times of the events E23 and E24, which are not registered in the event list 302. Similarly, based on the scheduled starting time of the event E32 and the polling interval T3, the timing control library 331 calculates the respective scheduled starting times of the events E32 and E33, which are not registered in the event list 302.

The timing control library 331 determines, as the target event, an event for which the interval between the scheduled starting time of the event and that of the event E12 is shortest, among the events E22 to E24, E32, and E33. In this example, the event E22 is determined as the target event.

The event management API 322 uses equation (2) and calculates the scheduled starting time FPT (t13') to correct the event E12. The FPT is FPT=(the time t13)+(the time t23'−the time t13)×1×1=12:41:20+(−15)=12:41:05. However, because the polling interval is not allowed to be set to be equal to or shorter than 45 seconds due to the constraining information of the process 1, the scheduled starting time t13' after the correction of the event E12 is 12:41:10.

As a result, the scheduled starting time of the event E12 is corrected from the time t13 (t13=12:41:20) to the time t13' (t13'=12:41:10). Consequent to this correction, the active time period of the execution time period of the device 303, triggered by the event E12 and the idle time period of the execution time period of the device 303, triggered by the event E22 overlap with each other and the execution time periods of the device 303 can be bundled.

Figure 11:
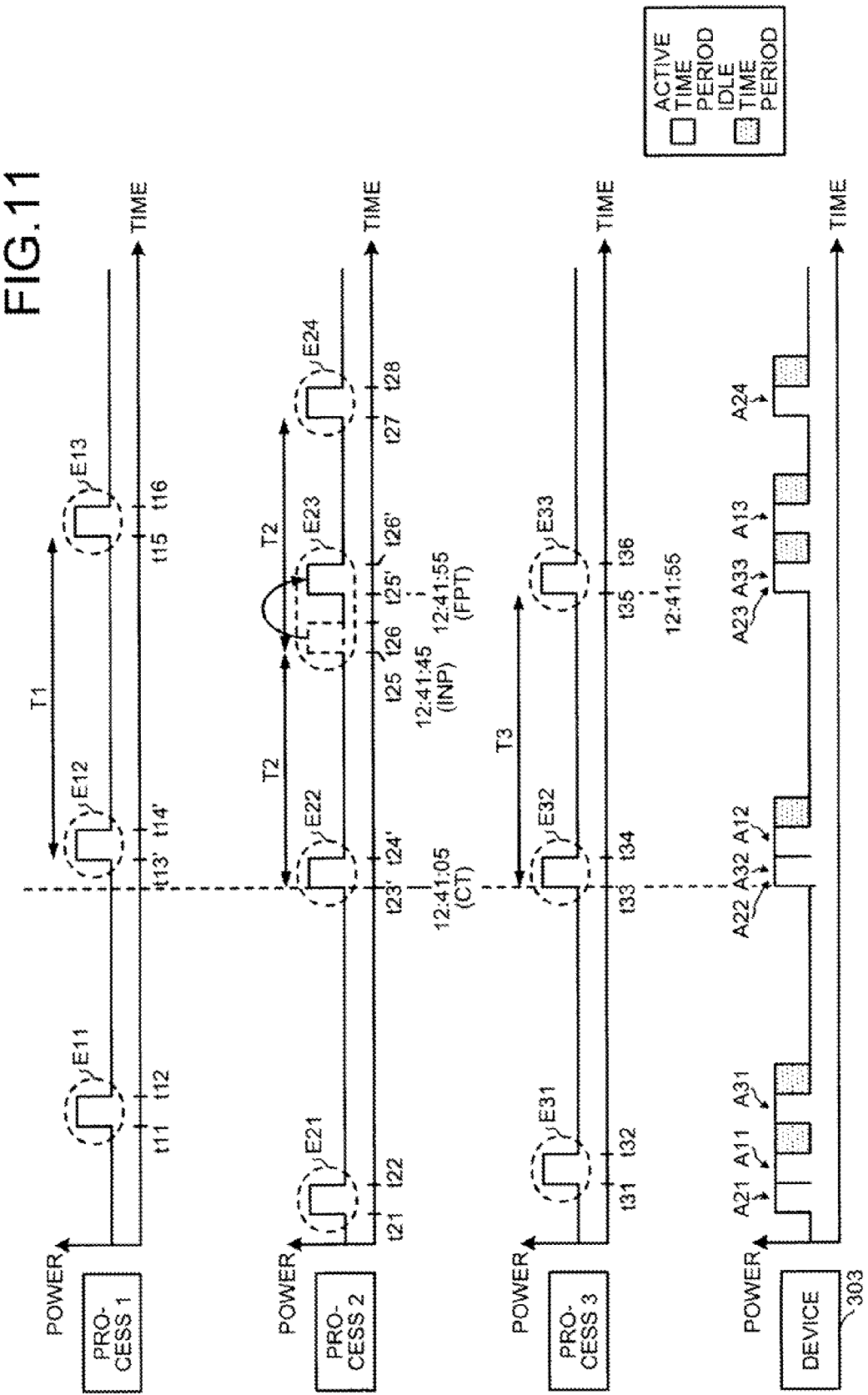
FIG. 11 depicts an example of correcting the scheduled starting time of an event according to the first example.

FIG. 11 depicts an example of correcting the scheduled starting time of the event E23 newly generated by the process 2 assuming that the time point at which the execution of the event E22 is started is the current time CT.

The process 2 starts the execution of the event E22 at the time t23' (t23'=12:41:05, the current time CT) and ends the execution at the time t24' (t24'=12:41:10). When the event E23, whose execution starts at the time t25 (t25=12:41:45) after the poling interval T2 elapses, is generated from the process 2 at the time t23', the timing control library 331 starts correction processing for the event E23.

At the time t23', the events E12 and E32 are in the event list 302. Based on the scheduled starting time of the event E12 and the polling interval T1, the timing control library 331 calculates the respective scheduled starting times of the events E13, which are not registered in the event list 302. Similarly, based on the scheduled starting time of the event E32 and the polling interval T3, the timing control library 331 calculates the respective scheduled starting times of the events E33, which are not registered in the event list 302.

The timing control library 331 determines, as the target event, an event for which the interval between the scheduled starting time of the event and that of the event E23 is shortest, among the events E12, E13, E32, and E33. In this example, the event E33 is determined as the target event.

The event management API 322 uses equation (2) and calculates the scheduled starting time FPT (t25') to correct the event E23. The FPT is FPT=(the time t25)+(the time t35−the time t25)×1×1=12:41:45+(10)=12:41:55.

As the result of the calculation, the scheduled starting time of the event E23 is corrected from the time t25 (t25=12:41:45) to the time t25' (t25'=12:41:55). Due to this correction, the execution time period of the device 303, triggered by the event E23 and the execution time period of the device 303, triggered by the event E33 overlap with each other and the execution time periods of the device 303 can be bundled.

Figure 12:
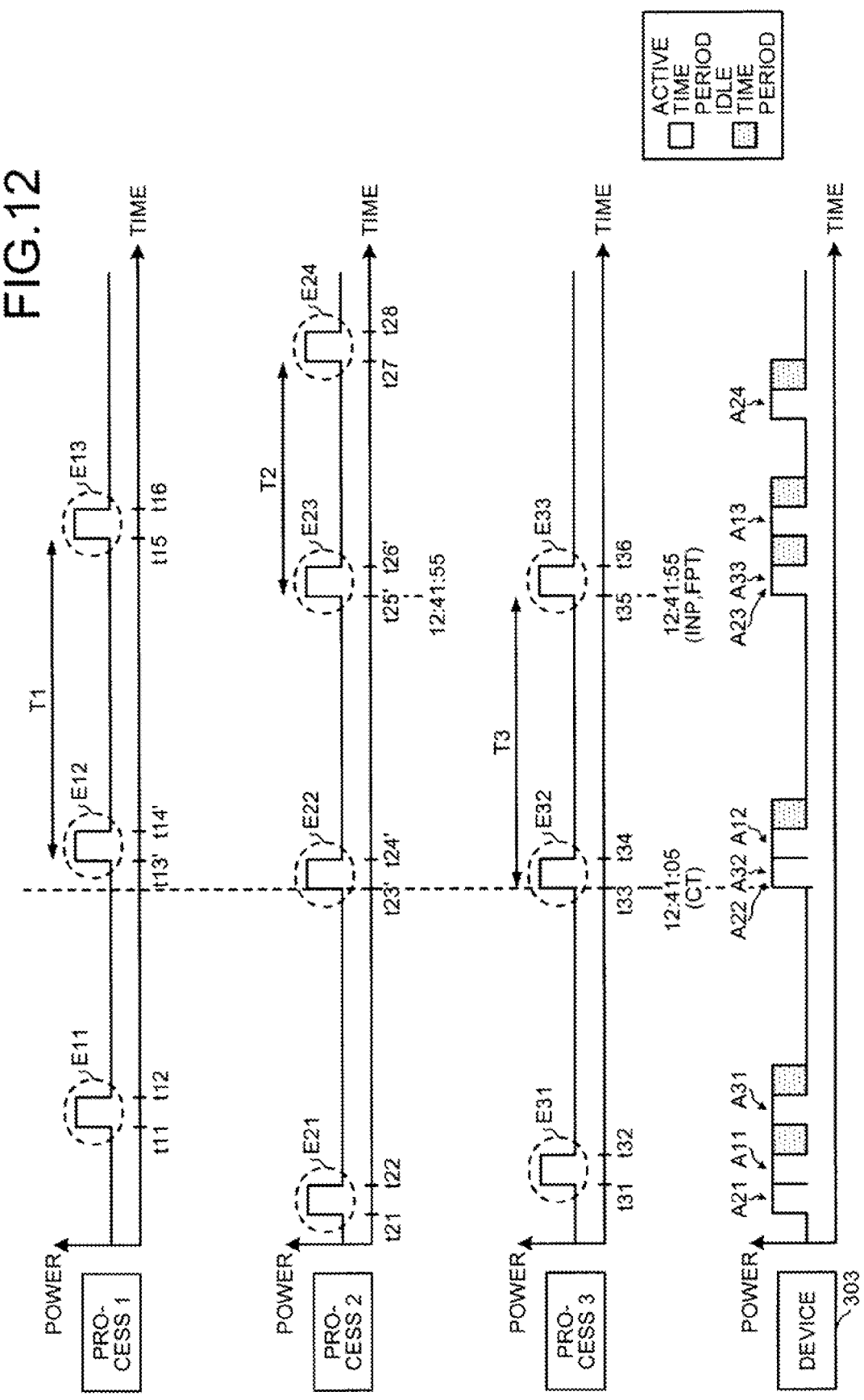
FIG. 12 depicts an example of correcting the scheduled starting time of an event according to the first example.

FIG. 12 depicts an example of correcting the scheduled starting time of the event E33 newly generated by the process 3 assuming that the time point at which the execution of the event E32 is started is the current time CT.

The process 3 starts the execution of the event E32 at the time t33 (t33=12:41:05, the current time CT) and ends the execution at the time t34 (t34=12:41:10). When the event E33, whose execution starts at the time t35 (t35=12:41:55) after the poling interval T3 elapses, is generated from the process 3 at the time t33, the timing control library 331 starts correction processing for the event E33.

At the time t33, the events E12 and E23 are in the event list 302. Based on the scheduled starting time of the event E12 and the polling interval T1, the timing control library 331 calculates the respective scheduled starting times of the event E13, which are not registered in the event list 302. Similarly, based on the scheduled starting time of the event E23 and the polling interval T2, the timing control library 331 calculates the respective scheduled starting times of the event E24, which are not registered in the event list 302.

The timing control library 331 determines, as the target event, an event for which the interval between the scheduled starting time of the event and that of the event E33 is shortest, among the events E12, E13, E23, and E24. In this example, the event E23 is determined as the target event.

The event management API 322 uses equation (2) and calculates the scheduled starting time FPT (t35') to correct the event E33. The FPT is FPT=(the time t35)+(the time t25'−the time t35)×1×1=12:41:55+(0)=12:41:55. As the result of the calculation, the scheduled starting time of the event E33 still remains to be the time t35 that is t35=12:41:55.

Figure 13:
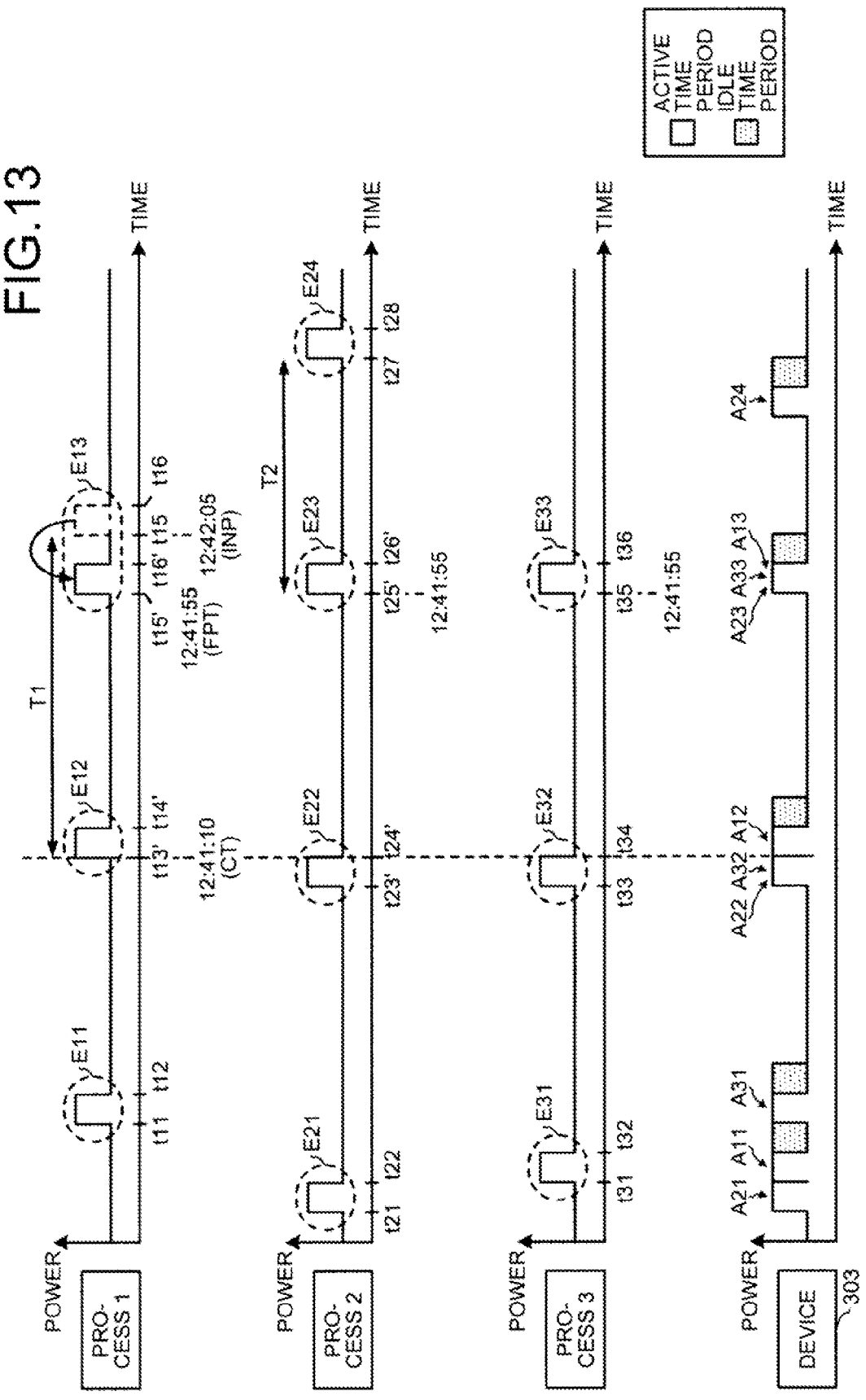
FIG. 13 depicts an example of correcting the scheduled starting time of an event according to the first example.

FIG. 13 depicts an example of correcting the scheduled starting time of the event E13 newly generated by the process 1 assuming that the time point at which the execution of the event E12 is started is the current time CT.

The process 1 starts the execution of the event E12 at the time t13' (t13'=12:41:10, the current time CT) and ends the execution at the time t14' (t14'=12:41:15). When the event E13, whose execution starts at the time t15 (t15=12:42:05) after the poling interval T1 elapses, is generated from the process 1 at the time t13', the timing control library 331 starts correction processing for the event E13.

At the time t13', the events E23 and E33 are in the event list 302. Based on the scheduled starting time of the event E23 and the polling interval T2, the timing control library 331 calculates the respective scheduled starting times of the events E24, which are not registered in the event list 302.

The timing control library 331 determines, as the target event, an event for which the interval between the scheduled starting time of the event and that of the event E13 is shortest, among the events E23, E24, and E33. In this example, the event E23 is determined as the target event.

The event management API 322 uses equation (2) and calculates the scheduled starting time FPT (t15') to correct the event E13. The FPT is FPT=(the time t15)+(the time t25'−the time t15)×1×1=12:42:05+(−10)=12:41:55.

As the result of the calculation, the scheduled starting time of the event E13 is corrected from the time t15 that is t15=12:42:05 to the time t15' that is t15'=12:41:55. In the correction of FIG. 10, the execution time period of the device 303, triggered by the event E12 and the execution time period of the device 303, triggered by another event do not completely overlap with each other. However, due to the correction of FIG. 13, the execution time period of the device 303, triggered by the event E13 and the execution time period of the device 303, triggered by the event E23 overlap with each other and the execution time periods of the device 303 can be bundled.

In this manner, the portable terminal device 200 executes the correction stepwise, and is able to finally shorten the execution time period of the device 303, triggered by the events generated by the process 1 and reduce power consumption.

In the example, the portable terminal device 200 determines as the target event, the event started at the time that is closest to the scheduled starting time of the event to be corrected. However, the portable terminal device 200 may determine as the target event, an arbitrary event whose scheduled starting time is within a predetermined time period that includes the scheduled starting time of the event to be corrected. The portable terminal device 200 may determine as the target event, an arbitrary event whose rank is within a predetermined rank when the events are arranged in order of event starting time that is closer to the scheduled starting time of the event to be corrected.

In the example, the portable terminal device 200 employs as the event to be corrected, an event that is newly generated by the process. However, configuration may be such that the portable terminal device 200 employs an event that is in the event list 302.

In the example, the portable terminal device 200 corrects the scheduled starting time of the event executed by each of the processes 1 to 3. However, some events may be present whose scheduled starting times are not corrected. For example, assuming that the events executed by the process 2 are events whose scheduled starting times are not corrected, the process 2 may execute these events maintaining the polling interval T2.

The portable terminal device 200 employs as the PAL, the index of the power consumption of the process that executes the event to be corrected. However, configuration may be such that the portable terminal device 200 employs an index of the power consumption of the process that executes the target event.

From among the index of the power consumption of the process that executes the event to be corrected and the index of the power consumption of the process that executes the target event, the portable terminal device 200 may select and employ the index whose value is larger. The larger value of the index of the power consumption, that is, the one indicating smaller power consumption is selected for the following reasons.

When the power consumption of the process is small, the power consumption of the device 303 associated with the process is small. When the execution time period during which the power consumption is large and the execution time period during which the power consumption is small overlap with each other, the amount of the smaller power consumption is the largest amount by which the power consumption is reduced. In this manner, the largest amount by which the power consumption is reduced depends on the smaller power consumption and therefore, the portable terminal device 200 selects the index value of the power consumption that is larger and thereby, is able to correct the scheduled starting time of the event to be corrected, based on the largest amount by which the power consumption is reduced.

In this manner, the portable terminal device 200 is able to bundle the execution time periods of multiple events, reduce the execution time period of the device 303, and reduce power consumption. Variation of the execution time period and the reduction of the power consumption of the device 303 consequent to the correction will be described with reference to FIG. 14.

Figure 14:
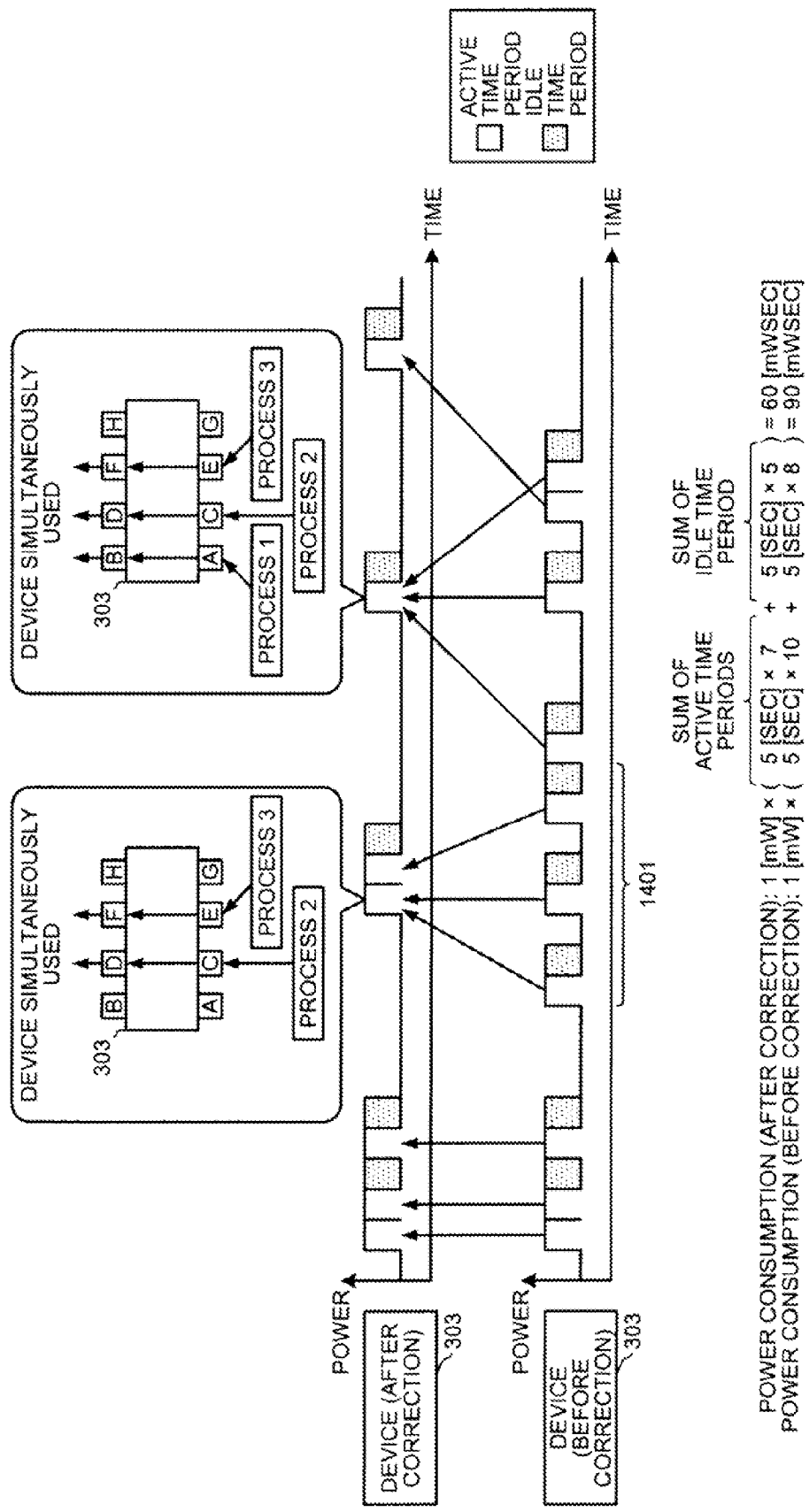
FIG. 14 is an explanatory diagram of the execution time period before and after the correction of the device 303 according to the first example.

FIG. 14 is an explanatory diagram of the execution time period before the correction and that after the correction of the device 303 according to the first example. The following precondition is present in FIG. 14. In the calculation of the power consumption, it is assumed that the power consumption of the device 303 in its low power mode is zero [mW].

The device 303 is simultaneously usable for the processes 1 to 3 (for example, a DMAC). For example, each of the processes is allowed to use channels of the DMAC that are different from those for other processes and thereby, the processes are able to simultaneously use the DMAC. It is assumed that, for example, the process 1 uses channels A and B, the process 2 uses channels C and D, and the process 3 uses channels E and F.

The power consumption of the device 303 is (the power consumption of the device 303×the execution time period thereof). In addition to the power consumption by the device 303, each of the I/Fs connected to the device 303 also consume power. In the example depicted in FIG. 14, however, the power consumption of each of the I/Fs is included in the power consumption of the device 303 and will not be described. The device 303 enters the low power mode when the execution time period of the device 303 comes to an end.

The variation of the execution time period and the reduction of the power consumption of the device 303 consequent to the correction will be described. For example, in FIG. 14, in a section denoted by a reference numeral "1401", the portable terminal device 200 bundles the execution time periods for the processes 1 to 3, causes each of the processes 1 to 3 to use channels of the device 303 that are different from those of other processes, and thereby, causes the processes 1 to 3 to simultaneously use the device 303. The portable terminal device 200 also bundles the active time period of the device 303 by the process 1 and the idle time period of the device 303 by the process 2 and reduces the execution time period of the device.

In the section denoted by the reference numeral "1401", before the correction, the portable terminal device 200 consumes power in the device 303 during the execution time period of the process 2, the process 3, and the process 1.

On the other hand, after the correction, the portable terminal device 200 only has to consume the power in the device 303 for the active time period of the device 303 simultaneously used by the processes 2 and 3 and the execution time period of the device 303 used by the process 1. The portable terminal device 200 is able to reduce the power consumption in the device 303 by the power consumption for the idle time period of the device 303 by the process 2 and the execution time period of the device 303 by the process 3.

The amount by which the power consumption is reduced overall in the example depicted in FIG. 14 will be described. Assuming that the power consumption of the device 303 per unit time is, for example, one [mW], the power consumption of the device 303 is 1 [mW]×(the total of the active time periods +the total of the idle time periods). Therefore, the power consumption of the device 303 before the correction is: 1 [mW]×(5 [second]×10+5 [second]×8)=90 [mWsecond]. On the other hand, the power consumption thereof after the correction is: 1 [mW]×(5 [second]×7+5 [second]×5)=60 [mWsecond]. Therefore, the portable terminal device 200 is able to reduce power consumption thereof by 30 [mWsecond].

Figure 15:
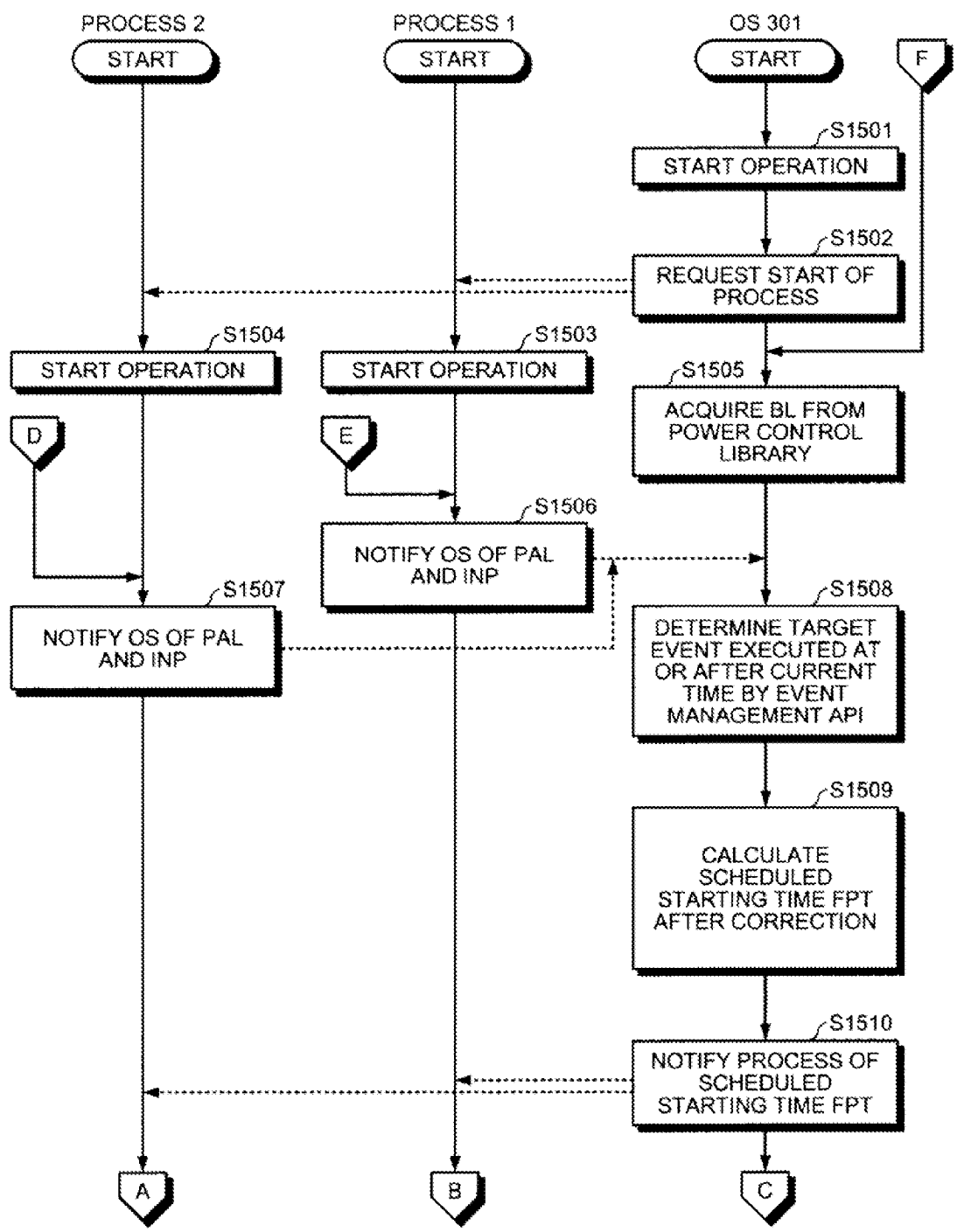
FIG. 15 is a flowchart of a scheduled starting time correcting operation.
Figure 16:
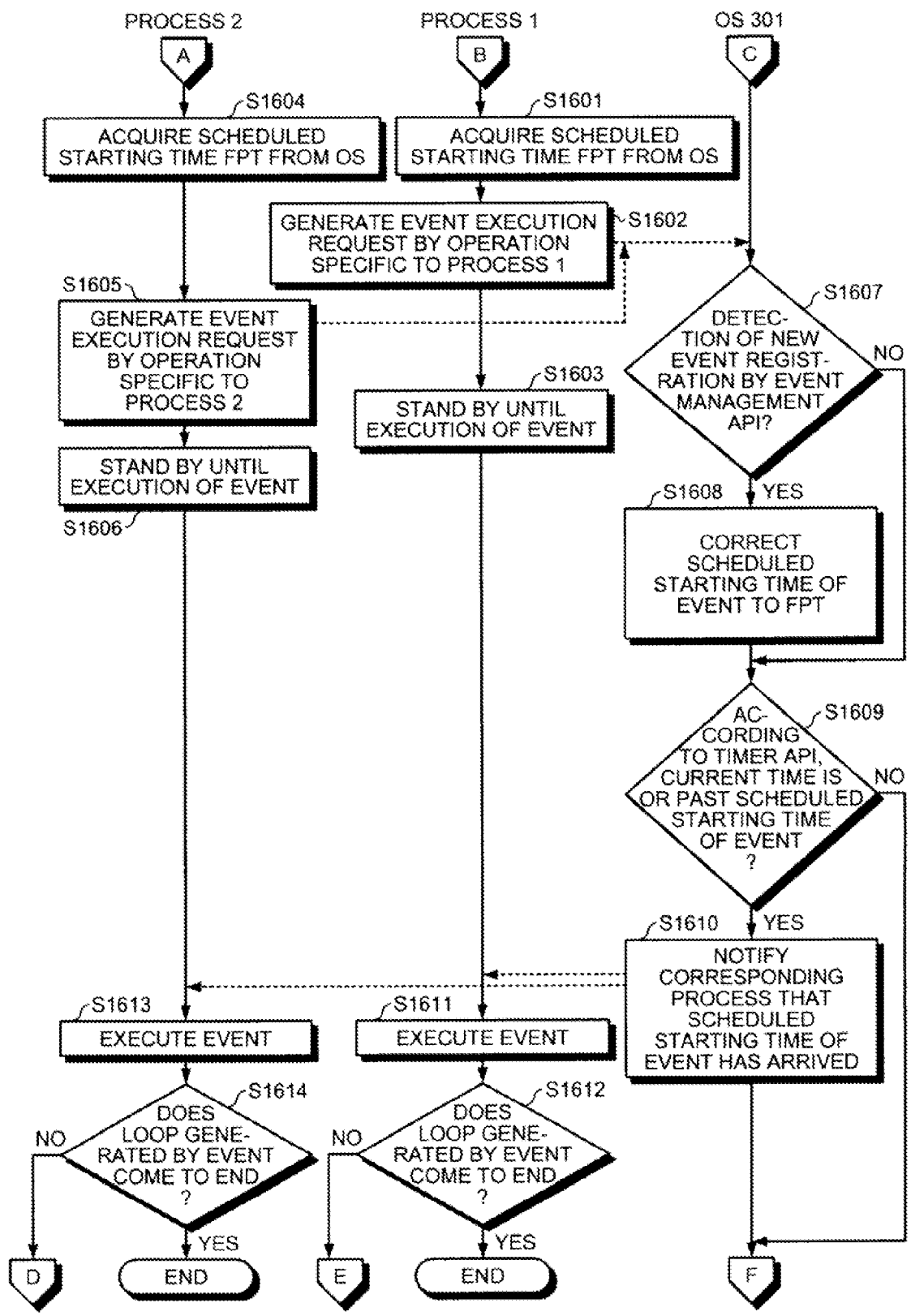
FIG. 16 is a flowchart of a scheduled starting time correcting operation.

It is assumed that processes started up in FIGS. 15 and 16 are the processes 1 and 2 by an application included in the application 310. When other processes to be started up are present in addition to the processes 1 and 2, the processing described below is executed for the other processes similarly to the processes 1 and 2. On the other hand, some processes may be present for which the processing described below is not executed, among the processes to be started up.

FIG. 15 is a flowchart of a scheduled starting time correcting operation (Part I). The OS 301 starts an operation after the boot, etc., of the portable terminal device 200 (step S1501). After the operation starts, the OS 301 executes a start-up request of a process according to an instruction, etc., from a user (step S1502). The process 1 receives the start-up request and starts operation (step S1503). Similarly, the process 2 receives the start-up request and starts operation (step S1504). After starting the operations, the processes 1 and 2 each start an event generating operation to execute polling correction.

The OS 301 acquires a BL from the power control library 332 (step S1505). The process 1, after starting operation, notifies the OS 301 of a PAL of the process 1 and the scheduled starting time INP before the correction of the process 1 (step S1506). Similarly, the process 2 notifies the OS 301 of a PAL of the process 2 and the scheduled starting time INP before the correction of the process 2 (step S1507).

The OS 301 detects the events in the event list 302 using the event management API 322, and detects events unregistered in the event list 302, based on the polling interval. The OS 301 determines the target event from among the events detected (step S1508).

It is assumed that, among the notification from the operation at step S1506 and that from the operation at step S1507, the OS 301 receives the notification from the operation at step S1506 before the notification from the operation at step S1507. After acquiring the target event, the OS 301 calculates the scheduled starting time FPT after the correction of the event by the process 1 (step S1509). The calculation equation for the correction is, for example, Examples 1, 2, and 3 of the calculation equation for the correction.

As to the operation at step S1509, when the notification of the process 2 at step S1507 is earlier than the notification from the process 1 at step S1506, the OS 301 calculates the scheduled starting time FPT after the correction of the event by the process 2 by substituting the values of the process 2. The calculation of the scheduled starting time FPT after the correction of the process 2 concerning step S1507 whose notification is later than the notification at step S1506, is executed when step S1509 is again executed. As to the acquisition of the current time CT, the OS 301 acquires the current time CT by invoking the timer API 323 before executing step S1509.

After the calculation, the OS 301 notifies the process of the scheduled starting time FPT after the correction calculated (step S1510). As to the process that is the notification destination, the notification is made for the process 1 when the process 1 is the process that is accepted earlier, and the notification is made for the process 2 when the process 2 is the process that is received earlier.

FIG. 16 is a flowchart of the scheduled starting time correcting operation (Part II). It is assumed that the OS 301 notifies the process 1 at step S1510. The process 1 acquires the scheduled starting time FPT after the correction (step S1601) and generates an event execution request by an operation specific to the process 1 (step S1602). The event is registered in the event list 302 by the event management API 322 invoked by the process 1. After the registration, the process 1 stands by until the time to execute the event (step S1603). At step S1603, the process 1 may execute, in addition to the execution of the process 1, another operation without standing by when another executable operation is present.

The OS 301 determines whether the event management API 322 has detected that a new event has been registered (step S1607). If the OS 301 determines that the event management API 322 has detected that a new event has been registered (step S1607: YES), the OS 301 determines the registered event as the event to be corrected and corrects the scheduled starting time of the event to be the FPT (step S1608).

In the operation at step S1601, the process 1 after acquiring the FPT may update the FPT, based on the constraining information that the process 1 retains. For example, it is assumed that, at the current time CT (12:40:25), notification of the FPT (12:41:05) is provided with the condition that the polling interval is equal to or longer than 45 seconds as the constraining information of the process 1. In this case, the process 1 determines the FPT' (FPT'=12:41:10) and notifies the OS 301 of the FPT' in the operation at step S1602. In the operation at step S1608, the OS 301 corrects the scheduled starting time of the event to be the FPT.

After step S1608 comes to an end or when the OS 301 determines that the event management API 322 detects no new event (step S1607: NO), the OS 301 determines if the timer API 323 indicates the current time to be at or after the scheduled starting time of an event, among the events registered in the event list 302 (step S1609). If the OS 301 determines that the timer API 323 indicates the current time to be at or after the scheduled starting time of an event (step S1609: YES), the OS 301 notifies the process that corresponds to the event, that the scheduled starting time of the event has arrived or passed (step S1610). After notifying the process or if the OS 301 determines that the timer API 323 indicates the current time to be at or after the scheduled starting time of no event (step S1609: NO), the OS 301 proceeds to the operation at step S1505.

The process 1 after receiving the notification that the current time is at or after the scheduled starting time, executes the event (step S1611). The process 1 after receiving the notification may execute another operation without standing by. For example, this corresponds to a case where another event is present whose priority is higher than that of the event. In this case, the process 1 may execute an operation of the event after completing the other operation.

After executing the event, the process 1 determines whether a loop generated by the event comes to an end (step S1612). When the process 1 determines that the loop generated by the event continues (step S1612: NO), the process 1 proceeds to the operation at step S1506. When the process 1 determines that the loop generated by the event comes to an end (step S1612: YES), the process 1 causes the event generating operation for executing the polling correction to come to an end.

In the operation at step S1506, the PAL is a value specific to the process and is not changed during the execution of the process. Therefore, the process 1 after advancing to the operation at step S1506 may transmit to the OS 301, only the INP that is the scheduled starting time before the correction of the next event, in the operation at step S1506, during or after the second session thereof.

When the OS 301 notifies the process 2 at step S1510, the process 2 executes the operation instead of the process 1. For example, the process 2 acquires the scheduled starting time FPT after the correction (step S1604) and generates an event execution request by an operation specific to the process 2 (step S1605). The event is registered in the event list 302 by the event management API 322 invoked by the process 2. After the registration, the process 2 stands by until the time of the execution of the event (step S1606). At step S1606, similarly to the process 1, the process 2 may execute another operation without standing by when the other operation to execute is present in addition to the execution of the event.

The process 2, after receiving the notification that the current time is at or after the scheduled starting time, executes the event (step S1613) and determines whether the loop generated by the event comes to an end (step S1614). When the process 2 determines that the loop generated by the event continues (step S1614: NO), the process 2 advances to the operation at step S1507. When the process 2 determines that the loop generated by the event comes to an end (step S1614: YES), the process 2 causes the event generating operation for executing the polling correction to come to an end.

Thereby, the portable terminal device 200 is able to bundle the execution time periods of the device 303, trigger by the multiple events, by bringing the scheduled starting times of the events close to each other, thereby reducing the power consumption of the device 303.

In the first example, the correction of the scheduled starting time executed when the device 303 is simultaneously usable has been described while, in a second example, correction of the scheduled starting time executed when the device 303 is not simultaneously usable will be described.

FIGS. 17 to 22 are explanatory diagrams of the contents of the correction of the scheduled starting time of an event to be corrected according to the second example. In the portable terminal device 200, the application 310 does not independently set the scheduled starting time of an event and the OS 301 corrects the scheduled starting time to be a proper scheduled starting time, based on a value supplied from the application 310. The application 310 may correct the scheduled starting time of the event, based on the scheduled starting time calculated by the OS 301.

An example of the calculation equation of the correction of the scheduled starting time in the second example will be described. The event management API 322 calculates the scheduled starting time before the correction of the event to be corrected according to equation (1) and corrects the scheduled starting time of the event to be corrected according to equation (5) below.

$$FPT=INP+(PT(n)-INP-\text{TASK of the event to be corrected})\times BL\times(1/PAL) \quad (5)$$

Where, "TASK" is the time period for processing the event. The event management API 322 may correct the scheduled starting time of the event to be corrected based on the constraining information. For example, a minimal value of the re-reading interval for a specific webpage is assumed as a specification of the polling interval of the browser application 311. In this case, the lower limit value of the scheduled starting time is set to be a value acquired by adding the minimal value of the re-reading interval to the current time CT. When the calculation result of equation (5) is smaller than the lower limit value, the event management API 322 may employ the lower limit value without employing the calculation result of equation (5) as the scheduled starting time after the correction.

In this manner, the scheduled starting time of the event to be corrected after the correction is calculated based on the difference (PT(n)−INP) between the scheduled starting time of the event to be corrected and that of the target event. When only one event is present, the event management API 322 executes no correction because PT(n) is not present. Therefore, the scheduled starting time of the corresponding event is equal to CT+T and the polling interval is equal to the polling interval T that is determined by the application based on the specification, etc.

The event management API 322 may determine to correct the scheduled starting time of the event to be corrected according to equation (5) when the INP is INP<PT(n), and according to equation (6) below when the INP is INP>PT(n). When the INP is INP=PT(n), the event management API 322 may determine to execute no correction.

$$FPT=INP+(PT(n)-INP+\text{TASK of the target event})\times BL\times(1/PAL) \quad (6)$$

Configuration may be such that the event management API 322 corrects the scheduled starting time of the event to be corrected only when the interval between the event to be corrected and the target event is shorter than a predetermined threshold value. Conditional expression (7) is an example of a determination equation to determine whether the interval between the event to be corrected and the target event is shorter or longer than the predetermined threshold value.

$$|FPT-PT(n)+\text{TASK of the event to be corrected}|<Th\times BL\times(1/PAL) \quad (7)$$

Where, "Th" is a constant. When conditional expression (7) is satisfied, the FPT of equation (5) is determined as the scheduled starting time after the correction of the event to be corrected. On the other hand, when conditional expression (7) is not satisfied, the INP of equation (1) is determined as the scheduled starting time after the correction of the event to be corrected Further, configuration may be such that the event management API 322 corrects the scheduled starting time of the event to be corrected only when the interval between the event to be corrected and the target event is longer than the predetermined threshold value. When conditional expression (7) is satisfied, the INP of equation (1) is determined as the scheduled starting time after the correction of the event to be corrected. On the other hand, when conditional expression (7) is not satisfied, the FPT of equation (5) is determined as the scheduled starting time after the correction of the event to be corrected.

An example will be described of the correction of the scheduled starting time of the event to be corrected executed when example 5 of the calculation equation for correction is used, with reference to FIGS. 17 to 23. To simplify the description, when no designation of the date and the time is attached to an indication of the time in FIGS. 17 to 23, a time on Apr. 3, 2010. The BL is set to be "1" and the PAL is set to be "1". It is assumed that the initial state is the state depicted in FIG. 7 and that the "TASK" in each event is five seconds.

FIG. 17 depicts an example of correcting the scheduled starting time of the event E22 newly generated by the process 2 assuming that the time point at which the execution of the event E21 is started is the current time CT.

The process 2 starts the execution of the event E22 at the time t21 (t21=12:40:10, the current time CT) and ends the execution at the time t22 (t22=12:40:15). When the event E22, whose execution starts at the time t23 (t23=12:40:50) after the poling interval T2 elapses, is generated from the process 2 at the time t21, the timing control library 331 starts correction processing for the event E22.

At the time t21, the events E11 and E31 are in the event list 302. Based on the scheduled starting time of the event E11 and the polling interval T1, the timing control library 331 calculates the respective scheduled starting times of the events E12 and E13, which are not registered in the event list 302. Similarly, based on the scheduled starting time of the event E31 and the polling interval T3, the timing control library 331 calculates the respective scheduled starting times of the events E32 and E33, which are not registered in the event list 302.

The timing control library 331 determines, as the target event, an event for which the interval between the scheduled starting time of the event and that of the event E22 is shortest, among the events E11 to E13 and E31 to E33. In this example, the event E32 is determined as the target event.

Because the t23 is t23<t33, the event management API 322 calculates the scheduled starting time FPT (t23') after the correction of the event E22 using equation (5). The TASK of the event E22 may be acquired by measuring the processing time period of the event E21 or may be acquired by estimation based on the processing time period of an event executed by the process 2 at or before the current time CT.

Therefore, the FPT is FPT=(the time t23)+(the time t33−the time t23−the TASK of the event E22)×1×1=12:40:50+(10)=12:41:00.

As the result of the calculation, the scheduled starting time of the event E22 is corrected from the time t23 (12:40:50) to the time 23' (12:41:00). Consequent to this correction, the idle time period of the execution time period of the device 303, triggered by the event E22 and the active time period of the execution time period of the device 303, triggered by the event E32 overlap with each other and thereby, the execution time periods of the device 303 can be bundled.

FIG. 18 depicts an example of correcting the scheduled starting time of the event E32 newly generated by the process 3 assuming that the time point at which the execution of the event E31 is started is the current time CT.

The process 3 starts the execution of the event E31 at the time t31 (t31=12:40:15, the current time CT) and ends the execution at the time t32 (t32=12:40:20). When the event E32, whose execution starts at the time t33 (t33=12:41:05) after the poling interval T3 elapses, is generated from the process 3 at the time t31, the timing control library 331 starts correction processing for the event E32.

At the time t31, the events E11 and E22 are in the event list 302. Based on the scheduled starting time of the event E11 and the polling interval T1, the timing control library 331 calculates the respective scheduled starting times of the events E12 and E13, which are not registered in the event list 302. Similarly, based on the scheduled starting time of the event E22 and the polling interval T2, the timing control library 331 calculates the respective scheduled starting times of the events E23 and E24, which are not registered in the event list 302.

The timing control library 331 determines, as the target event, an event for which the interval between the scheduled starting time of the event and that of the event E32 is shortest, among the events E11 to E13 and E22 to E24. In this example, the event E22 is determined as the target event. The event management API 322 executes no correction because the INP is INP=PT(n).

FIG. 19 depicts an example of correcting the scheduled starting time of the event E12 newly generated by the process 1 assuming that the time point at which the execution of the event E11 is started is the current time CT.

The process 1 starts the execution of the event E11 at the time t11 (t11=12:40:25, the current time CT) and ends the execution at the time t12 (t12=12:40:30). When the event E12, whose execution starts at the time t13 (t13=12:41:20) after the poling interval T1 elapses, is generated from the process 1 at the time t11, the timing control library 331 starts correction processing for the event E12.

At the time t11, the events E22 and E32 are in the event list 302. Based on the scheduled starting time of the event E22 and the polling interval T2, the timing control library 331 calculates the respective scheduled starting times of the events E23 and E24, which are not registered in the event list 302. Similarly, based on the scheduled starting time of the event E32 and the polling interval T3, the timing control library 331 calculates the respective scheduled starting times of the event E33, which are not registered in the event list 302.

The timing control library 331 determines, as the target event, an event for which the interval between the scheduled starting time of the event and that of the event E12 is shortest, among the events E22 to E24, E32, and E33. In this example, the event E32 is determined as the target event.

Because the time t13 is t13>t33, the event management API 322 calculates the scheduled starting time FPT (t13') after the correction of the event E12 using equation (6). The TASK of the event E32 is acquired by estimation based on the processing time period of an event executed by the process 3 at or before the current time CT (for example, the event E31).

Therefore, the FPT is FPT=(the time t13)+(the time t33−the time t13+the TASK of the event E32)×1×1=12:41:20+(−10)=12:41:10.

As the result of the calculation, the scheduled starting time of the event E12 is corrected from the time t13 (12:41:20) to the time t13' (12:41:10). Consequent to this correction, the active time period of the execution time period of the device 303, triggered by the event E12 and the idle time period of the execution time period of the device 303, triggered by the event E22 overlap with each other and thereby, the execution time periods of the device 303 can be bundled.

FIG. 20 depicts an example of correcting the scheduled starting time of the event E23 newly generated by the process 2 assuming that the time point at which the execution of the event E22 is started is the current time CT.

The process 2 starts the execution of the event E22 at the time t23' (t23'=12:41:00, the current time CT) and ends the execution at the time t24' (t24'=12:41:05). When the event E23, whose execution starts at the time t25 (t25=12:41:40) after the poling interval T2 elapses, is generated from the process 2 at the time t23', the timing control library 331 starts correction processing for the event E23.

At the time t23', the events E12 and E32 are in the event list 302. Based on the scheduled starting time of the event E12 and the polling interval T1, the timing control library 331 calculates the respective scheduled starting times of the event E13, which are not registered in the event list 302. Similarly, based on the scheduled starting time of the event E32 and the polling interval T3, the timing control library 331 calculates the respective scheduled starting times of the event E33, which are not registered in the event list 302.

The timing control library 331 determines, as the target event, an event for which the interval between the scheduled starting time of the event and that of the event E23 is shortest, among the events E12, E13, E32, and E33. In this example, the event E33 is determined as the target event.

Because the time t25 is t25<t35, the event management API 322 calculates the scheduled starting time FPT (t25') after the correction of the event E23 using equation (5). The TASK of the event E23 is acquired similarly to the TASK of the event E22.

Therefore, the FPT is FPT=(the time t25)+(the time t35−the time t25+the TASK of the event E23)×1×1=12:41:40+(10)=12:41:50.

As the result of the calculation, the scheduled starting time of the event E23 is corrected from the time t25 (12:41:40) to the time 25' (12:41:50). Consequent to this correction, the idle time period of the execution time period of the device 303, triggered by the event E23 and the active time period of the execution time period of the device 303, triggered by the event E33 overlap with each other and thereby, the execution time periods of the device 303 can be bundled.

FIG. 21 depicts an example of correcting the scheduled starting time of the event E33 newly generated by the process 3 assuming that the time point at which the execution of the event E32 is started is the current time CT.

The process 3 starts the execution of the event E32 at the time t33 (t33=12:41:05, the current time CT) and ends the execution at the time t34 (t34=12:41:10). When the event E33, whose execution starts at the time t35 (t35=12:41:55) after the poling interval T3 elapses, is generated from the process 3 at the time t33, the timing control library 331 starts correction processing for the event E33.

At the time t33, the events E12 and E23 are in the event list 302. Based on the scheduled starting time of the event E12 and the polling interval T1, the timing control library 331 calculates the respective scheduled starting times of the event E13, which are not registered in the event list 302. Similarly, based on the scheduled starting time of the event E23 and the polling interval T2, the timing control library 331 calculates the scheduled starting time of the event E24, which are not registered in the event list 302.

The timing control library 331 determines, as the target event, an event for which the interval between the scheduled starting time of the event and that of the event E33 is shortest, among the events E12, E13, E23, and E24. In this example, the event E23 is determined as the target event.

Because the time t35 is t35>t25, the event management API 322 calculates the scheduled starting time FPT (t35') after the correction of the event E12 using equation (6). The TASK of the event E33 is acquired similarly to the TASK of the event E32.

Therefore, the FPT is FPT=(the time t35)+(the time t25'−the time t35+the TASK of the event E33)×1×1=12:41:55+(0)=12:41:55. As the result of the calculation, the scheduled starting time of the event E33 remains to be the time t35 (12:41:55).

FIG. 22 depicts an example of correcting the scheduled starting time of the event E13 newly generated by the process 1 assuming that the time point at which the execution of the event E12 is started is the current time CT.

The process 1 starts the execution of the event E12 at the time t13' (t13'=12:41:10, the current time CT) and ends the execution at the time t14' (t14'=12:41:15). When the event E13, whose execution starts at the time t15 (t15=12:42:05) after the poling interval T1 elapses, is generated from the process 1 at the time t13', the timing control library 331 starts correction processing for the event E13.

At the time t13', the events E23 and E33 are in the event list 302. Based on the scheduled starting time of the event E23 and the polling interval T2, the timing control library 331 calculates the scheduled starting time of the event E24, which are not registered in the event list 302.

The timing control library 331 determines, as the target event, an event for which the interval between the scheduled starting time of the event and that of the event E13 is shortest, among the events E23, E24 and E33. In this example, the event E23 is determined as the target event.

Because the time t15 is t15>t35, the event management API 322 calculates the scheduled starting time FPT (t15') after the correction of the event E12 using equation (6). The TASK of the event E33 is acquired similarly to the TASK of the event E32.

Therefore, the FPT is FPT=(the time t15')+(the time t25'−the time t15'+the TASK of the event E33)×1×1=12:42:05+(−5)=12:42:00.

As a result, the scheduled starting time of the event E13 is corrected from the time t15 (t15=12:42:05) to the time t15' (t15'=12:42:00). Consequent to this correction, the active time period of the execution time period of the device 303, triggered by the event E13 and the idle time period of the execution time period of the device 303, triggered by the event E33 overlap with each other and the execution time periods of the device 303 can be bundled.

In the example, the portable terminal device 200 determines, as the target event, the event started at the time that is closest to the scheduled starting time of the event to be corrected. However, configuration may be such that the portable terminal device 200 determines, as the target event, an arbitrary event whose scheduled starting time is within a predetermined time period that includes the scheduled starting time of the event to be corrected. The portable terminal device 200 may determine, as the target event, an arbitrary event whose rank is within a predetermined rank when the events are arranged in order of event starting time that is closer to the scheduled starting time of the event to be corrected.

In the example, as the event to be corrected, the event that is newly generated by the process is employed. However, the portable terminal device 200 may employ an event that is in the event list 302.

In the example, the portable terminal device 200 corrects the scheduled starting time of the event executed by each of the processes 1 to 3. However, some events may be present whose scheduled starting times are not corrected. For example, assuming that the events executed by the process 2 are events whose scheduled starting times are not corrected, the process 2 may execute these events maintaining the poling interval T2.

As the PAL, the index of the power consumption of the process that executes the event to be corrected is employed. However, configuration may be such that the portable terminal device 200 employs an index of the power consumption of the process that executes the target event.

From among the index of the power consumption of the process that executes the event to be corrected and the index of the power consumption of the process that executes the target event, the portable terminal device 200 may select and employ the index whose value is larger. The larger value of the index of the power consumption, that is, the one indicating smaller power consumption is selected for the following reasons.

When the power consumption of the process is small, the power consumption of the device 303 associated with the process is small. When the execution time period during which the power consumption is large and the execution time period during which the power consumption is small overlap with each other, the amount of the smaller power consumption is the largest amount by which the power consumption is reduced. In this manner, the largest amount by which the power consumption is reduced depends on the smaller power consumption and therefore, the portable terminal device 200 selects the index value of the power consumption that is larger and thereby, is able to correct the scheduled starting time of the event to be corrected, based on the largest amount by which the power consumption is reduced.

In this manner, the portable terminal device 200 is able to bundle the execution time periods of multiple events, reduce the execution time period of the device 303, and reduce power consumption. Variation of the execution time period and the reduction of the power consumption of the device 303 consequent to the correction will be described with reference to FIG. 23.

FIG. 23 is an explanatory diagram of the execution time period before the correction and that after the correction of the device 303 according to the second example. The following precondition is present in FIG. 23. In the calculation of the power consumption, it is assumed that the power consumption of the device 303 in its low power mode is zero [mW]. The device 303 is a device 303 that is not simultaneously usable for the processes 1 to 3.

The power consumption of the device 303 is (the power consumption of the device 303×the execution time period thereof). In addition to the power consumption by the device 303, each of the I/Fs connected to the device 303 also consume power. In the example depicted in FIG. 23, however, the power consumption of each of the I/Fs is included in the power consumption of the device 303 and will not be described. The device 303 enters the low power mode when the execution time period of the device 303 comes to an end.

Variation of the execution time period and reduction of the power consumption of the device 303 due to the correction will be described. For example, in FIG. 23, in a section denoted by a reference numeral "2301", the portable terminal 200 bundles the execution time period of the device 303 by the process 2, that of the device 303 by the process 3, and that of the device 303 by the process 1 and reduces the execution time period of the device 303.

In the section denoted by the reference numeral "2301", before the correction, the portable terminal device 200 consumes power in the device 303 during the execution time period of the process 2, the process 3, and the process 1.

On the other hand, after the correction, the portable terminal device 200 only has to consume the power in the device 303 for the active time period of the device 303 by the processes 2 and 3 and the execution time period of the device 303 by the process 1. The portable terminal device 200 is able to reduce the power consumption in the device 303 by the power consumption for the idle time periods of the device 303 by the processes 2 and 3.

The amount by which the power consumption is reduced overall in the example depicted in FIG. 23 will be described. Assuming that the power consumption of the device 303 per unit time is, for example, one [mW], the power consumption of the device 303 is 1 [mW]×(the total of the active time periods+the total of the idle time periods). Therefore, the power consumption of the device 303 before the correction is: 1 [mW]×(5 [second]×10+5 [second]×8)=90 [mWsecond]. On the other hand, the power consumption thereof after the correction is: 1 [mW]×(5 [second]×10+5 [second]×5)=75 [mWsecond]. Therefore, the portable terminal device 200 is able to reduce power consumption thereof by 15 [mWsecond].

The scheduled starting time correcting operation executed by the OS 301 in the second example is similar to the operation described with reference to FIGS. 15 and 16, and the calculation equation for the correction at step S1509 is merely replaced by Examples 4 to 7 of the calculation equation for the correction. Therefore, the details thereof will not be described.

As described, according to the information processing apparatus, the power control method, and the power control program, the scheduled starting time of the event to be corrected is corrected such that the interval becomes short between the scheduled starting time of the event to be corrected and the scheduled starting time of the target event, among the events to be executed at the current time or thereafter. Consequently, the information processing apparatus is able to reduce power consumption by bundling the execution time periods of the device 303 executed associated with the processing of the events.

The information processing apparatus calculates the difference between the scheduled starting time of each event and the scheduled starting time of the events to be corrected, and determines as the target event, the event whose difference calculated is smallest among the events. Thereby, the information processing apparatus is able to minimize the variation of the polling interval generated by the correction of the scheduled starting time of the event to be corrected.

The information processing apparatus determines as the target event, the event whose difference calculated is equal to or smaller than the predetermined threshold value, among the events. Consequently, the information processing apparatus is able exclude from those for the determination of the target event, the events to be started at the times whose intervals from the scheduled starting time of the event to be corrected are long. In this case, no reduction of the power consumption is expected and therefore, the information processing apparatus is able to determine to execute no correction.

The information processing apparatus determines as the target event, the events whose differences calculated are equal to or larger than the predetermined threshold value, among the events. Thereby, the information processing apparatus is able to exclude from those for the determination of the target event, the events started at the times whose intervals to the scheduled starting time of the event to be corrected are short. Therefore, the information processing apparatus is able to determine to execute no correction when the event to be determined as the target event is only present in the vicinity of the event to be corrected.

The information processing apparatus determines as the target event, any one event whose rank is within a predetermined rank when the events are arranged in order of increasing difference of the group of differences calculated. Thereby, the information processing apparatus is able to determine the target event even when no predetermined threshold value is determined in advance for each event.

The information processing apparatus corrects the scheduled starting time of the event to be corrected to be the scheduled starting time of the target event. Consequently, when the device 303 is simultaneously usable for the multiple processes, the processes of the event to be corrected and the target event simultaneously use the device 303. Therefore, the information processing apparatus is able to maximize the amount by which the execution time period is reduced of the device 303, by the event to be corrected and the target event and thereby, facilitate power saving by the device 303.

When the device 303 is not simultaneously usable for multiple processes, either one event of the event to be corrected and the target event uses the device 303 and the other event waits for the execution of the event to come to an end. Therefore, the information processing apparatus is able to cause the other event to start before the device 303 used by the event enters the idle time period. The information processing apparatus is able to reduce the execution time period of the device 303 and facilitate power saving by the device 303.

The information processing apparatus corrects the scheduled starting time of the event to be corrected to be the scheduled ending time of the target event. Thereby, the information processing apparatus is able to cause the event to be corrected to start before the device 303 used by the target event enters the idle time period. Therefore, the information processing apparatus is able to reduce the execution time period of the device 303 and facilitate power saving by the device 303.

The information processing apparatus corrects the scheduled starting time of the event to be corrected and thereby, causes the scheduled ending time of the event to be corrected and the scheduled starting time of the target event to coincide with each other. Thereby, the information processing apparatus is able to cause the target event to start before the device 303 used by the event to be corrected enters the idle time period. Therefore, the information processing apparatus is able to reduce the execution time period of the device 303 and facilitate power saving by the device 303.

The information processing apparatus corrects the scheduled starting time of the event to be corrected within the scope that the constraining information for the event to be corrected is complied with. Thereby, the event is executed within the scope that the specification of the application executing the event to be corrected is not breached and therefore, the application is prevented from executing any operation that is not expected by the user or the producer of the application.

In the correction within the scope that the constraining information is complied with, the information processing apparatus may not able to cause the execution time period of the device 303, triggered by the event to be corrected and that of the device 303, triggered by the target event to overlap with each other. In this case, the information processing apparatus corrects stepwise, the scheduled starting time assuming that an event to be executed after the execution of the event to be corrected by the process that executes the event to be corrected, is a new event to be corrected. Thereby, finally, the information processing apparatus is able to cause the execution time period of the device 303, triggered by the event to be corrected to overlap with that of the device 303, triggered by the target event and thereby, reduce power consumption by the device 303.

The information processing apparatus may correct the scheduled starting time of the event to be corrected based on the differences calculated, and the power consumption of either the event to be corrected or the target event. For example, the information processing apparatus executes the correction such that the interval between the scheduled starting times of the event to be corrected and the target event becomes shorter as the power consumption of either event becomes larger. Thereby, the information processing apparatus is able to reduce the power consumption of the application that significantly affects power consumption. When the power consumption of the event is small, the polling interval before the correction is prioritized.

The information processing apparatus may correct the scheduled starting time of the event to be corrected, based on the differences calculated and the remaining power level retained by the information processing apparatus. For example, the information processing apparatus corrects the scheduled starting time of the event to be corrected such that the interval between the scheduled starting time of the event to be corrected and that of the target event becomes shorter as the remaining power level is lower. Thereby, the information processing apparatus is able to suppress power consumption when the remaining power level is low. When the remaining power level is high, the polling interval before the correction is prioritized.

The power control method described in the present embodiment may be implemented by executing a prepared program on a computer such as a personal computer and a workstation. The program is stored on a computer-readable medium such as a hard disk, a flexible disk, a CD-ROM, an MO, and a DVD, read out from the recording medium, and executed by the computer. The program may be distributed through a network such as the Internet. However, the computer-readable medium does not include a transitory medium such as a propagation signal.

According to an aspect of the present invention, reduced power consumption is effected.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
   a first detector that detects, by a processor, a scheduled starting time of an event that is to be corrected and to be executed at a given time or thereafter;
   a second detector that detects in processing contents that are different from that of the event detected by the first detector, a scheduled starting time of each event among a plurality of events to be executed at the given time or thereafter;
   a calculator that calculates the difference between the scheduled starting time detected by the first detector and each of the scheduled starting times detected by the second detector;
   a determiner that determines a target event for the event to be corrected, from among the plurality of events and based on the differences calculated by the calculator; and
   a corrector that corrects the scheduled starting time detected by the first detector such that (1) the difference between the scheduled starting time detected by the first detector and the scheduled starting time of the target event determined by the determiner decreases and (2) an execution time period of a device, triggered by the target event and an execution time period of the device, triggered by the event to be corrected overlap with each other, wherein the device executes the event that is to be corrected and the target event.

2. The information processing apparatus according to claim 1, wherein the determiner determines, as the target event, an event whose difference is smallest among the plurality of events.

3. The information processing apparatus according to claim 1, wherein the determiner determines, as the target event, an event whose difference is less than or equal to a given threshold, among the plurality of events.

4. The information processing apparatus according to claim 1, wherein the determiner determines, as the target event, an event whose difference is greater than or equal to a given threshold, among the plurality of events.

5. The information processing apparatus according to claim 1, wherein the determiner determines an event whose rank is within a predetermined rank when the plurality of events is arranged in ascending order of the calculated difference, as the target event.

6. The information processing apparatus according to claim 1, wherein the corrector corrects the scheduled starting time of the event, based on a power consumption of the event to be corrected or the target event.

7. The information processing apparatus according to claim 1, wherein the corrector corrects the scheduled starting time of the event to be corrected, based on a remaining power level that the information processing apparatus retains.

8. The information processing apparatus according to claim 1, wherein the corrector corrects the scheduled starting time of the event to be corrected within a scope that the corrector complies with constraining information for the event to be corrected.

9. The information processing apparatus according to claim 1, wherein the corrector corrects the scheduled starting time of the event to be corrected to be the scheduled starting time of the target event.

10. The information processing apparatus according to claim 1, wherein the corrector corrects the scheduled starting time of the event to be corrected to be a time acquired by adding an estimated processing time period to the scheduled starting time of the target event.

11. The information processing apparatus according to claim 1, wherein the corrector corrects the scheduled starting time of the event to be corrected to be a time acquired by subtracting an estimated processing time period from the scheduled starting time of the target event.

12. The information processing apparatus according to claim 1, wherein the corrector executes no correction when no target event is determined by the determiner.

13. An information processing method executed by a computer, the information processing method comprising:
   detecting a scheduled starting time of an event that is to be corrected and to be executed at a given time or thereafter;
   detecting in processing contents that are different from that of the event detected at the former detecting, a scheduled starting time of each event among a plurality of events to be executed at the given time or thereafter;

calculating the difference between the scheduled starting time detected at the former detecting and each of the scheduled starting times detected at the latter detecting;

determining a target event for the event to be corrected, from among the plurality of events and based on the differences calculated at the calculating; and correcting the scheduled starting time detected at the detecting such that (1) the difference between the scheduled starting time detected at the detecting and the scheduled starting time of the target event determined at the determining decreases and (2) an execution time period of a device, triggered by the target event and an execution time period of the device, triggered by the event to be corrected overlap with each other, wherein the device executes the event that is to be corrected and the target event.

14. A non-transitory computer-readable medium storing therein an information processing program that causes a computer to execute a process, the process comprising:

detecting a scheduled starting time of an event that is to be corrected and to be executed at a given time or thereafter;

detecting in processing contents that are different from that of the event detected at the former detecting, a scheduled starting time of each event among a plurality of events to be executed at the given time or thereafter;

calculating the difference between the scheduled starting time detected at the former detecting and each of the scheduled starting times detected at the latter detecting;

determining a target event for the event to be corrected, from among the plurality of events and based on the differences calculated at the calculating; and correcting the scheduled starting time detected at the detecting such that (1) the difference between the scheduled starting time detected at the detecting and the scheduled starting time of the target event determined at the determining decreases and (2) an execution time period of a device, triggered by the target event and an execution time period of the device, triggered by the event to be corrected overlap with each other, wherein the device executes the event that is to be corrected and the target event.

* * * * *